(12) United States Patent
Nakamura

(10) Patent No.: US 9,215,372 B2
(45) Date of Patent: Dec. 15, 2015

(54) IMAGE DEVICE AND IMAGING METHOD

(71) Applicant: Olympus Imaging Corp., Shibuya-ku, Tokyo (JP)

(72) Inventor: Satoru Nakamura, Fujimi (JP)

(73) Assignee: Olympus Corporation, Tokyo (JP)

( * ) Notice: Subject to any disclaimer, the term of this patent is extended or adjusted under 35 U.S.C. 154(b) by 29 days.

(21) Appl. No.: 14/174,568

(22) Filed: Feb. 6, 2014

(65) Prior Publication Data

US 2014/0218599 A1 Aug. 7, 2014

(30) Foreign Application Priority Data

Feb. 7, 2013 (JP) .................................. 2013-021997

(51) Int. Cl.
*H04N 5/232* (2006.01)
*H04N 5/369* (2011.01)
*H04N 5/361* (2011.01)

(52) U.S. Cl.
CPC ......... *H04N 5/23241* (2013.01); *H04N 5/3698* (2013.01); *H04N 5/23245* (2013.01); *H04N 5/23296* (2013.01); *H04N 5/361* (2013.01)

(58) Field of Classification Search
CPC ............ H04N 5/23241; H04N 5/3698; H04N 5/23245; H04N 5/23296; H04N 5/361
USPC ...................... 348/333.13, 372; 396/301–304
See application file for complete search history.

(56) References Cited

U.S. PATENT DOCUMENTS

| 8,300,142 B2 * | 10/2012 | Konno ........................... 348/372 |
| 2010/0085448 A1* | 4/2010 | Fukuoka ....................... 348/241 |
| 2012/0242871 A1* | 9/2012 | Iwashita et al. ................ 348/241 |

FOREIGN PATENT DOCUMENTS

JP 2006-140733 6/2006

* cited by examiner

*Primary Examiner* — Twyler Haskins
*Assistant Examiner* — Padma Haliyur
(74) *Attorney, Agent, or Firm* — John C. Pokotylo; Straub & Pokotylo

(57) ABSTRACT

An imaging device of the present invention operates with supply of power from a main power supply, and comprises an imaging section having an image sensor for forming a subject image and outputting image data, a variable voltage conversion section, supplied with power from the main power supply, for converting to a designated voltage based on control signals, and outputting the designated voltage, a constant voltage section that receives output of the variable voltage conversion section and supplies a constant voltage signal to the image sensor, a noise level prediction section for predicting and outputting a noise level of image data of the image sensor, and a control section for calculating a voltage value input to the constant voltage section in accordance with output from the noise level prediction section, and designating an output voltage to the variable voltage conversion section.

8 Claims, 16 Drawing Sheets

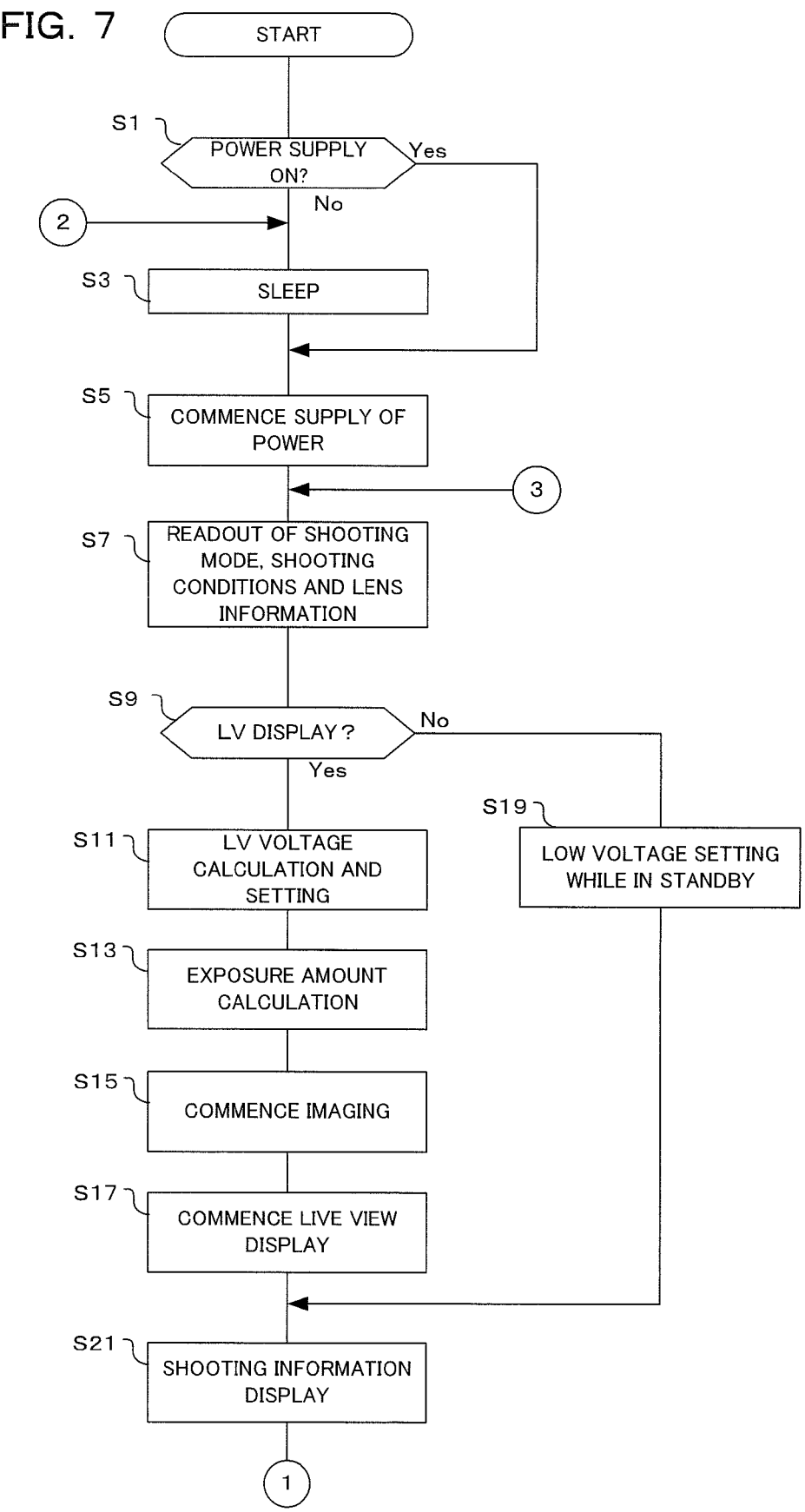

IMAGE DEVICE AND IMAGING METHOD

Benefit is claimed, under 35 U.S.C. §119, to the filing date of prior Japanese Patent Application No. 2013-021997 filed on Feb. 7, 2013. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method, and in detail relates to an imaging device and an imaging method for supplying a constant voltage from a main power supply to an imaging section via a power supply section.

2. Description of the Related Art

An image sensor performs photoelectric conversion on an optical image and outputs image signals, but imaging noise occurs in the image accompanying increase in ambient temperature of the image sensor, which degrades image quality. In order to prevent this imaging noise, in Japanese patent laid open number 2006-140733, if a specified temperature is exceeded a power supply is dropped, a specified mode is transitioned to, a CCD clock is lowered, or a cooling device is operated.

SUMMARY OF THE INVENTION

An object of the present invention is to provide an imaging device and imaging method that prevent image degradation due to noise, and that do not impair usability.

An imaging device of the present invention, that operates with supply of power from a main power supply, comprises an imaging section having an image sensor for forming a subject image and outputting image data, a variable voltage conversion section, supplied with power from the main power supply, for converting to a designated voltage based on control signals, and outputting the designated voltage, a constant voltage section that receives output of the variable voltage conversion section and supplies a constant voltage signal to the image sensor, a noise level prediction section for predicting and outputting a noise level of image data of the image sensor, and a control section for calculating a voltage value input to the constant voltage section in accordance with output from the noise level prediction section, and designating an output voltage of the variable voltage conversion section.

An imaging method of the present invention, for an imaging device that is operated by supply of power from a main power supply and has an imaging section including an image sensor for forming a subject image and outputting image data, comprises an output step of causing a variable voltage conversion section to convert a power supply from a main power supply to a designated voltage based on control signals, and output the designated voltage, a supply step of receiving output of the variable voltage conversion section and causing a constant voltage section to supply a constant voltage signal to the image sensor, a prediction step of causing a noise level prediction section to predict noise level of image data of the image sensor, and a designation step for calculating a voltage value input to the constant voltage section in accordance with output from the noise level prediction section, and designating an output voltage to the variable voltage conversion section.

BRIEF DESCRIPTION OF THE DRAWINGS

FIG. 7 is a flowchart showing operation of the camera of one embodiment of the present invention.

DETAILED DESCRIPTION OF THE PREFERRED EMBODIMENTS

Preferred embodiments using a camera to which the present invention has been applied will be described in the following in accordance with the drawings. The camera of a preferred one embodiment of the present invention is a digital camera. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation, still picture image data is stored in a storage medium. Image data that has been stored in the storage medium can be played back and displayed on the display section if playback mode is selected.

Also, this camera is operated by supply of power from a main power supply. A constant voltage is supplied to the imaging section from a variable voltage conversion section. This constant voltage is controlled so that predicted noise level of the image sensor and power consumption loss become optimum, in accordance with a noise level predicted based on ambient temperature of the image sensor and dark current, or operating mode, etc.

Figure 1A:
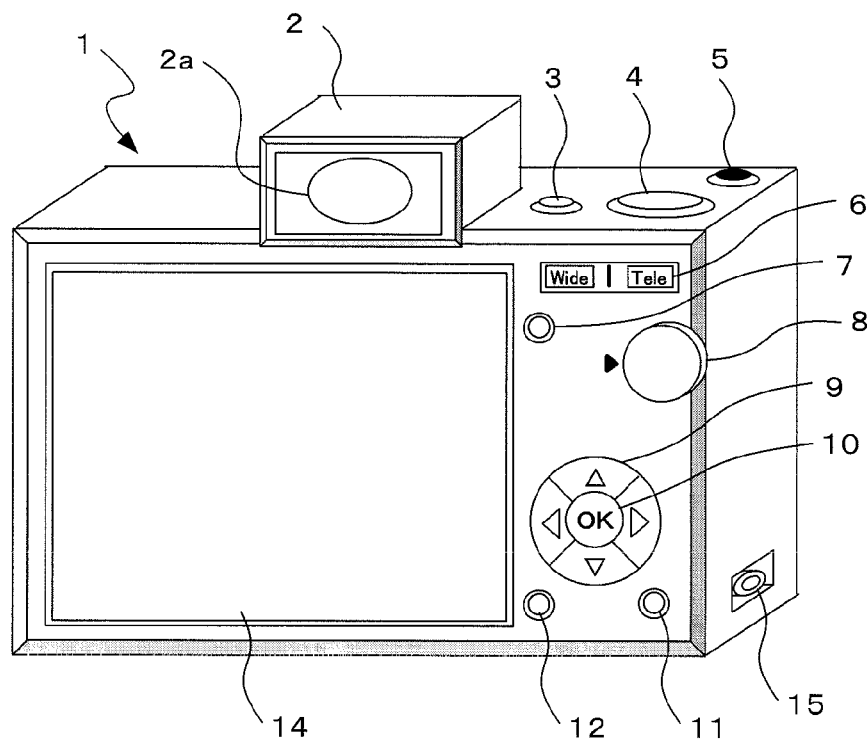
FIG. 1A and FIG. 1B are drawings showing the external appearance of a camera of one embodiment of the present invention, with FIG. 1A being an external perspective view looking from the rear, and FIG. 1B being an external perspective view looking from the front.
Figure 1B:
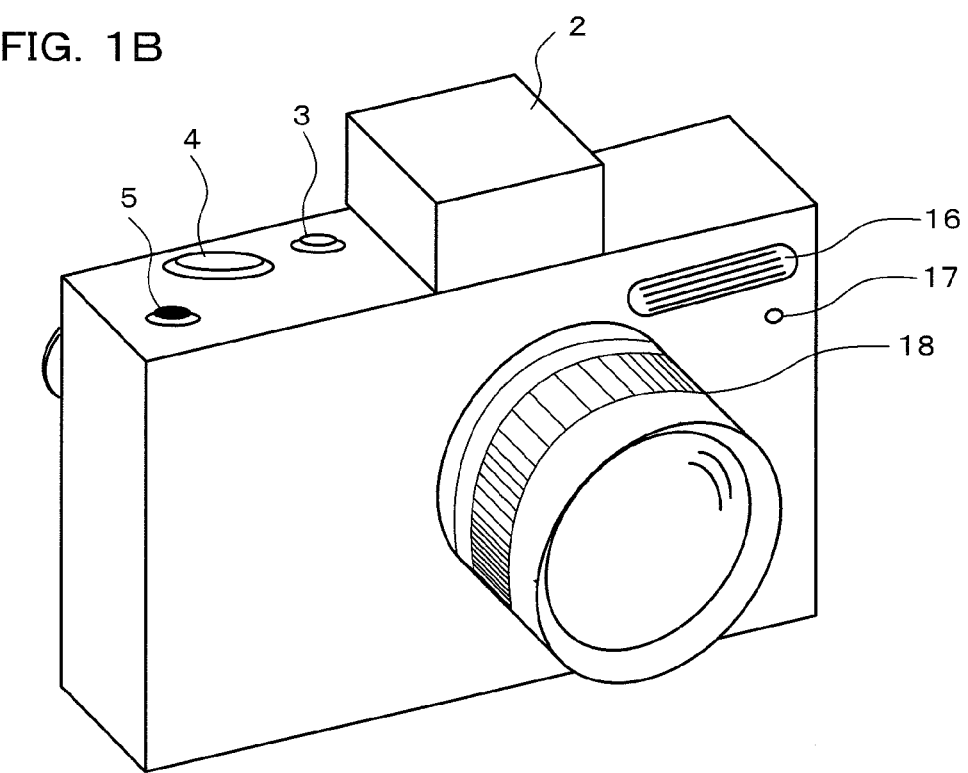

FIG. 1A and FIG. 1B are drawings showing the external appearance of a camera of one embodiment of the present invention, with FIG. 1A being an external perspective view looking from the rear, and FIG. 1B being an external perspective view looking from the front.

An electronic viewfinder (hereinafter referred to as EVF) 2 is arranged substantially in the center of the camera body 1. The EVF 2 has a small EVF display panel 2c inside (refer to FIG. 2), and the photographer can observe a live view image or a playback image that has been displayed on the EVF display panel 2c by means of a viewfinder eyepiece 2a.

Also, a power supply button 3, a shutter release button 4, and a movie record button 5 are arranged on an upper part of the camera body 1. The power supply button 3 is an operation button for putting the camera body 1 into a power on state as a result of the photographer performing a press operation, and putting the camera body 1 into a power off state as a result of performing the press operation again. Instead of the power supply button 3 it is also possible to arrange another operation member such as a power supply switch.

If the shutter release button 4 is pressed down half way by the photographer the camera body 1 carries out shooting preparation operations, and if the shutter release button 4 is pressed down fully a shooting operation is instructed. In the shooting preparation state, the camera body 1 measures subject brightness, carries out calculation of exposure control values such as aperture value and shutter speed value, and also carries out automatic focus adjustment (AF). Also, at the time of the shooting operation, exposure control is carried out in accordance with exposure control values that were calculated in the shooting preparation state, and at this time image data for a still image that has been formed by the image sensor is acquired, and the image data is stored in a storage medium 35.

The movie record button 5 is an operation member used by the photographer to designate commencement and completion of movie recording. Specifically, in a state where movie shooting mode has been selected by a mode dial 8, if the movie record button 5 is pressed then movie image data that has been formed by the image sensor is acquired, and storage of image data to the storage medium 35 is commenced. If the movie record button 5 is pressed once again after commencement of recording of the movie, movie recording is terminated. The shutter release button 4 may also serve as the movie record button 5, and in this case commencement and termination of movie shooting may be carried out by operation of the shutter release button 4 after movie recording mode has been set using the mode dial 8 or menu screens.

A zoom button 6, a display switch button 7, the mode dial 8, a cross-shaped button 9, an OK button 10, a delete button 11, and a menu button 12 are arranged on the right side of the rear surface of the camera body 1, with a rear surface panel 14 being arranged on the left side of these operating members.

The zoom button 6 is an operation member for the photographer to adjust focal length of the photographing lens 41 that is provided with an optical zoom function within the lens barrel 18, and has a Wide button and a Tele button. If the Wide button is pressed the focal length of the photographing lens 41 is driven to the wide-angle (short focus) side, while if the Tele button is pressed it is driven to the close-up (long focus) side. Also, if the Wide button is pressed and the lens is stopped at the wide end, and then the Wide button continues to be pressed, a macro mode is switched to. If the Tele button continues to be pressed after the lens has reached the tele end, electronic zoom is switched to and the image is further magnified. If electronic zoom is switched to, then differing from the optical zoom that was in use up to that point, zooming is carried out by cropping some of the image data and carrying out enlarged display. With this embodiment, focal length is adjusted using the zoom button, but this is not limiting and it is also possible, for example, to adjust focal length using a rotating member.

The display switch button 7 is an operation member for the photographer to carry out switching as to which of the EVF 2 or the rear surface panel 14 is used as a display unit. Each time this display switch button 7 is pressed, the display alternates between being the EVF 2 or the rear surface panel 14, for display of live view images, playback images or menu screens.

The mode dial 8 is a rotatable operation member, and a mode matching an indicator (a triangular mark in the drawings) is executed. It is possible to set various mode as the mode to be executed, such as, for example, exposure control modes such as shooting mode, playback mode, sports mode, and also art filter mode or movie shooting mode.

The cross-shaped button 9 is an operation member for moving a cursor or the like up, down, left and right, on menu screens etc. and is constituted by 4 buttons for respectively indicating up, down, left and right. An OK button (also called a decision button or confirmation button) 10 is arranged substantially in the middle of these 4 buttons. This OK button 10 is an operation member for confirming items that have been selected on the menu screens etc. using the cross-shaped button 9.

The delete button 11 is an operation member for deleting selected image data. This deletion is deletion of image data stored in the storage medium 35 if the delete button 11 is pressed after designating an image using the cross-shaped button 9 and the OK button 10.

If the menu button 12 is operated by the photographer, a menu screen is displayed on the rear surface panel 14 or the EVF 2. The photographer can carry out various settings, such as flash firing mode etc., using the menu screens.

The rear surface panel 14 is capable of displaying various images such as a live view image, a play back image or menu screens. Also, a touch panel 14a is provided on this rear surface panel 14, and if the touch panel 14a is touched by the photographer while looking at an image that is displayed on the rear surface panel 14, information relating to this touched position is output. With this embodiment, a liquid crystal display panel is used as the rear surface panel, but this is not limiting and it is also possible to use another display panel such as an organic EL panel etc. Also, the rear surface panel 14 has been arranged on the rear surface of the camera body 1, but this is not limiting, and it is also possible, for example, for the panel to be arranged at another position.

A DC input terminal 15 is provided on a side surface of the camera body 1. The DC input terminal 15 is a terminal for supply of power to the camera body 1 using an external power supply. For example, power may be supplied by converting AC power to DC power, and supplying a DC voltage. This can be used when performing flash photography indoors etc.

A flash 16, a light control 17 and a lens barrel 18 are provided on the front surface of the camera body 1. The flash 16 provides supplementary illumination, and automatically fires when a subject is dark, or is forcibly fired by the photographer etc. The light control window 17 is a window for guiding reflected light etc. to a light control sensor 24c (refer to FIG. 3) for measuring reflected light from a subject etc. at the time of firing the flash 16. In the case of automatically controlling the amount of flashlight at the time of flash firing, control is carried out based on a signal from the light control sensor 24c.

The lens barrel 18 may be an interchangeable lens barrel that can be attached to and removed from the camera body 1, or may be a lens barrel that is fixed to the camera body 1. The photographing lens 41 (refer to FIG. 2), as was described previously, is arranged inside the lens barrel 18.

Figure 2:
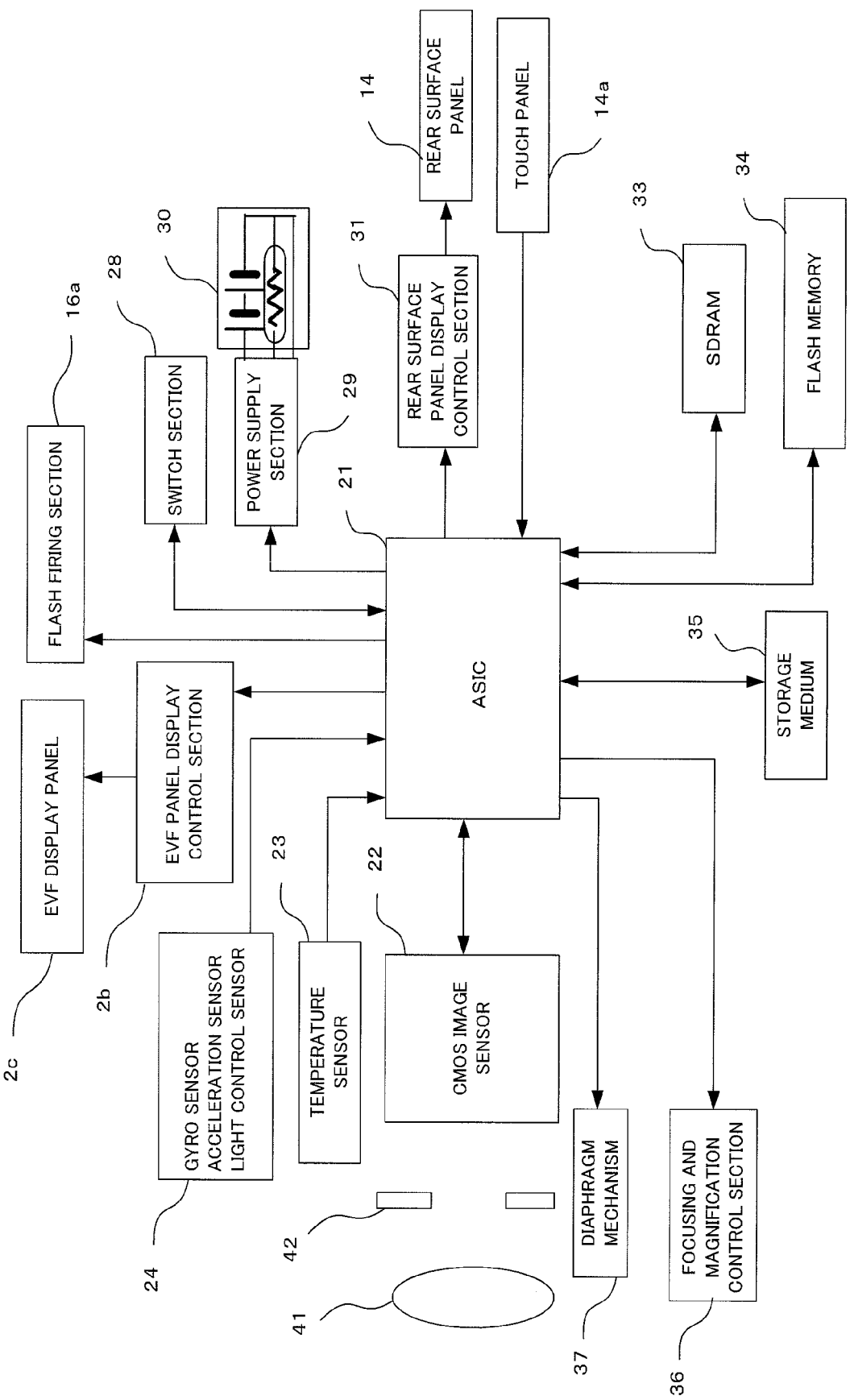
FIG. 2 is a block diagram mainly showing the electrical structure of a camera of one embodiment of the present invention.

Next, the electrical structure of this embodiment will be described using FIG. 2. As was described previously, the photographing lens 41 is a variable focal length zoom lens, with a diaphragm 42 being arranged on the optical axis of this photographing lens 41, and a CMOS (Complementary Metal Oxide Semiconductor) image sensor 22 being arranged close to a position where a subject image is formed by the photographing lens 41.

Figure 3:
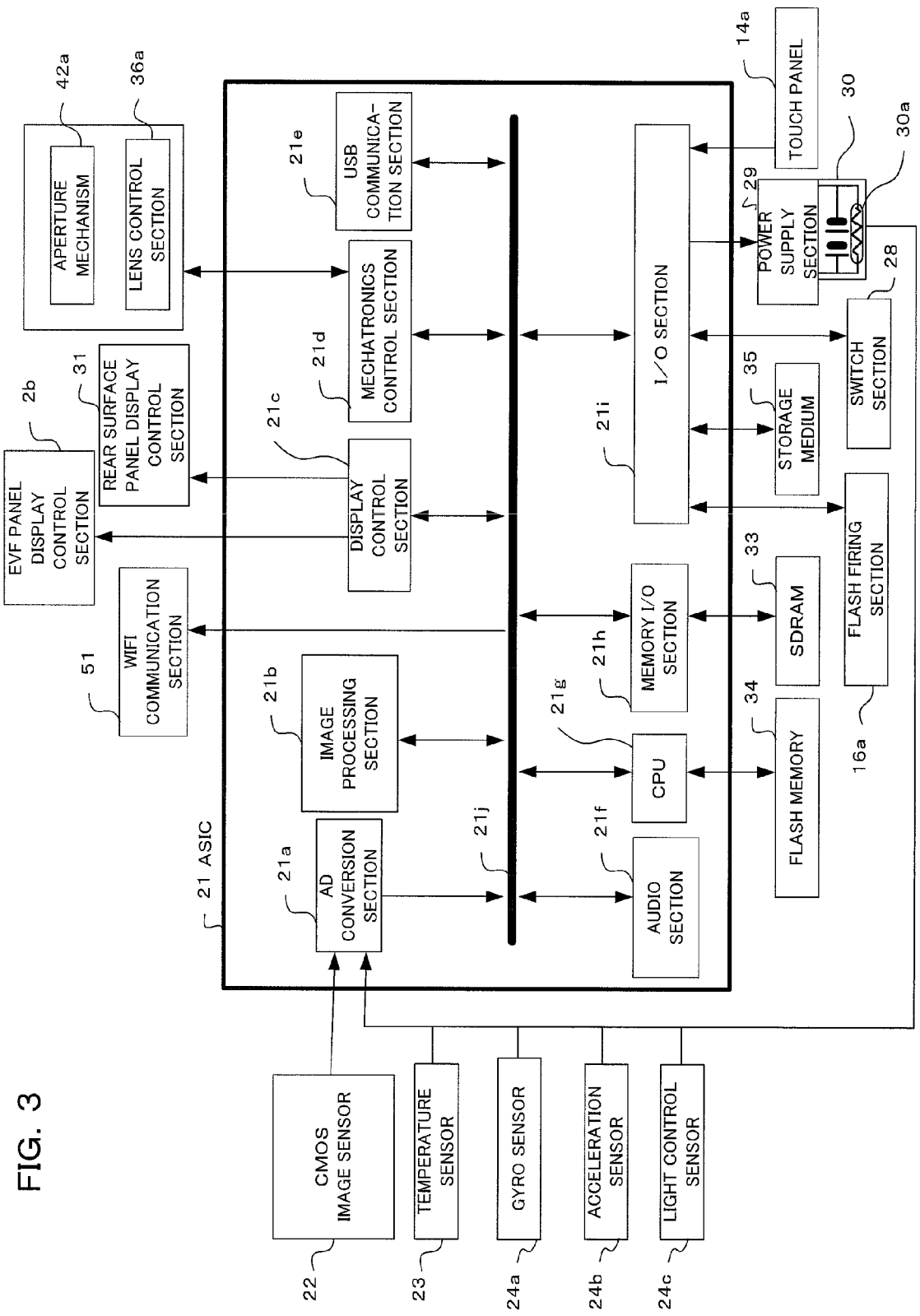
FIG. 3 is a block diagram showing an ASIC, and its peripheral circuits, of the camera of one embodiment of the present invention.

The diaphragm 42 varies an amount of light, of subject light flux that has passed through the photographing lens 41, using a diaphragm mechanism 42a (refer to FIG. 3). Also, a focus lens of the photographing lens 41 is moved in the optical axis direction by a focusing and magnification control section 36 to perform focus, while a zoom lens of the photographing lens 41 is moved in the optical axis direction by the focusing and magnification control section 36 to carry out zooming (magnification).

The CMOS image sensor 22 performs imaging of an optical image that has been formed by the photographing lens 41. This image sensor has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. This stored charge is read out, and output to an A/D conversion section 21a of an ASIC 21 (refer to FIG. 3).

Also, part of an image forming region of the CMOS image sensor 22 has an OB region 22a that is optically shielded (refer to FIG. 4), with signals from this OB region also being output to the A/D conversion section 21a of the ASIC 21, to detect dark current IOB. The CMOS image sensor 22 also has an electronic shutter. The CMOS image sensor 22 and peripheral circuitry functions as an imaging section having an image sensor for forming a subject image and outputting image data.

A temperature sensor 23 is arranged close to the CMOS image sensor 22. This temperature sensor 23 measures the ambient temperature of the CMOS image sensor 22, and outputs a temperature measurement signal to the ASIC 21.

A sensor group 24 is a sensor for measuring vibrations applied to the camera body 1 and flash reflected light. With this embodiment, the sensor group 24 has a gyro sensor 24a, an acceleration sensor 24b and a light control sensor 24c (refer to FIG. 3). The gyro sensor 24a and the acceleration sensor 24b detect vibrations applied to the camera body 1 due to hand shake of the photographer etc., and output detection signals to the ASIC 21. The light control sensor 24c measures reflected light from a main subject at the time of firing the flash 16 by means of the light control window 17, as was described previously, and outputs a photometry signal to the ASIC 21.

An EVF panel display control section 2b is input with image data for display from the ASIC 21, and carries out display control for the EVF display panel 2c. Also, a flash firing section 16a is a firing section of the flash 16, and carries out flash firing in accordance with control signals from the ASIC 21. A switch (SW) section 28 includes various operation members, such as the previously described power supply button 3, shutter release button 4, movie record button 5, zoom button 6, display switch button 7, mode dial 8, cross-shaped button 9, OK button 10, delete button 11, and menu button 12, detects operating states of these operating members, and outputs the detected states to the ASIC 21.

A power supply section 29 is connected to a power supply battery 30, converts a power supply voltage supplied from this power supply battery 30 to a constant voltage, and supplies the constant voltage to each circuit, for example, the ASIC 21, CMOS image sensor 22, temperature sensor 23, sensor group 24 etc. The power supply section 29, power supply battery 30, and their peripheral circuitry, will now be described in detail using FIG. 3.

A rear surface panel display control section 31 is input with image data for display from the ASIC 21, and carries out display control for the rear surface panel 14. Also, a touch panel 14a is provided on the front surface of the rear surface panel 14, and if the photographer touches on the rear surface panel 14 a detection signal relating to this touched position is output to the ASIC 21.

An SDRAM (Synchronous Dynamic Random Access Memory) 33 is connected to the ASIC 21, and temporarily holds data such as image data from the CMOS image sensor 22.

A flash memory 34 is an electrically rewritable nonvolatile memory, and stores programs for operation by a CPU (Central processing unit) 21g (refer to FIG. 3) within the ASIC 21, and various adjustment values.

A storage medium 35 is an electrically rewritable nonvolatile memory that can either be removably installed into the camera body 1 or is fixed within the camera body 1. This storage medium 35 stores image data for a still image or a movie that has been acquired at the time of the shooting operation, and at the time of playback stored image data can be read out.

The ASIC 21 has various circuits, such as the A/D conversion section 21a, an image processing section 21b, a display control section 21c, a mechatronics control section 21d etc., and carries out various processing such as processing of image signals from the CMOS image sensor 22, display processing for the EVF display panel 2c and the rear surface panel 14, and focusing of the photographing lens 41. The ASIC 21 also has a CPU 21g, and carries out overall control of the camera body 1 in accordance with programs stored in the flash memory 34. The programs may also be stored in the storage medium 35 instead of the flash memory 34, and the ASIC 21 may read out and execute programs that are stored in the storage medium 35.

Next, the ASIC 21 and its peripheral circuitry will be described in detail using FIG. 3. For each of the circuits of external sections of the ASIC 21, those shown in FIG. 2 are assigned the same reference numerals and detailed description will be omitted. The gyro sensor 24a, acceleration sensor 24b and light control sensor 24c are sensors within the sensor group 24. Also, a WIFI communication section 51 carries out wireless communication conforming to the WiFi (Wireless Fidelity) standard between the camera body 1 and external devices. A lens control section 36a is provided inside the focusing and magnification control section 36, and carries out drive control for focusing and zooming of the photographing lens 41. The diaphragm mechanism 42a performs drive of the diaphragm 42. A battery temperature sensor 30a is provided inside the power supply battery 30, to measure temperature of the power supply battery 30 and output a temperature measurement signal to the A/D conversion section 21a.

A bus 21j is provided inside the ASIC 21, and the A/D conversion section 21a, image processing section 21b, display control section 21c, mechatronics control section 21d, USB communications section 21e, audio section 21f, CPU 21g, memory I/O 21h and I/O section 21i are connected to this bus 21j. Exchange of various data and control signals is carried out via this bus 21j.

The A/D conversion section 21a is input with analog signals, which are converted to digital data and output to the bus 21j. As input analog signals, there are image signals from the CMOS image sensor 22, a temperature measurement signal of the image sensor from the temperature sensor 23, detection signals from the gyro sensor 24a, the acceleration sensor 24b and the light control sensor 24c, and a temperature measurement signal corresponding to the temperature of the battery from the power supply battery 30.

The image processing section 21b performs various image processing for image data from the CMOS image sensor 22 that has been input via the bus 21j, and outputs the result to the bus 21j. As the various image processing there are image processing for live view display, image processing for storage to the storage medium 35, and image processing for playback of an image that has been read out from the storage medium 35. In the case where art filter mode has been set using the mode dial 8, image processing in accordance with the selected art filter mode is also carried out. Further, the image processing section 21b generates contrast signals in accordance with high-frequency components from image data of the CMOS image sensor 22 for AF control.

The display control section 21c is input with live view images and playback images that have been subjected to image processing by the image processing section 21b, or menu screens, which are then output to the EVF panel display control section 2b and the rear surface panel display control section 31. Which of these is output is determined in accordance with operating state of the display switch button 7 that has been input by means of the switch section 28 and the I/O section 21i.

The mechatronics control section 21d performs drive control by means of the lens control section 36a, so that the focusing lens of the photographing lens 41 reaches a focus position, based on the contrast signals that were generated by the image processing section 21b. The mechatronics control section 21d also performs drive control of the zoom lens of the photographing lens 41 using the lens control section 36a, in accordance with operating state of the zoom button 6 that has been input by means of the switch section 28. The mechatronics control section 21d further performs drive control of the aperture mechanism 42 in accordance with exposure control values (including aperture value) that have been calculated by the CPU 21g (refer to S49 in FIG. 9).

The USB communications section 21e performs communication with external devices by means of a USB terminal (not illustrated) provided in the camera body 1. The audio section 21f is input with a voice signal from a microphone (not illustrated), performs voice processing on this voice signal, and stores in the storage medium 35 together with image data for a still image or a movie. The audio section 21f also performs processing of voice signals that have been stored in the storage medium 35 to carry out playback of voice from a speaker (not shown).

The CPU 21g, as was described previously, carries out overall control of the camera body 1 in accordance with programs stored in the flash memory 34.

The memory I/O section 21h is an interface for carrying our reading and writing of data to and from the SDRAM 33. The I/O section 21i is an interface for carrying out read and write of data between each of the circuits within the ASIC 21 and the flash firing section 16a, storage medium 35, switch section 28, power supply section 29, and touch panel 14a, via the bus 21j, or output etc. of control commands.

Figure 4:
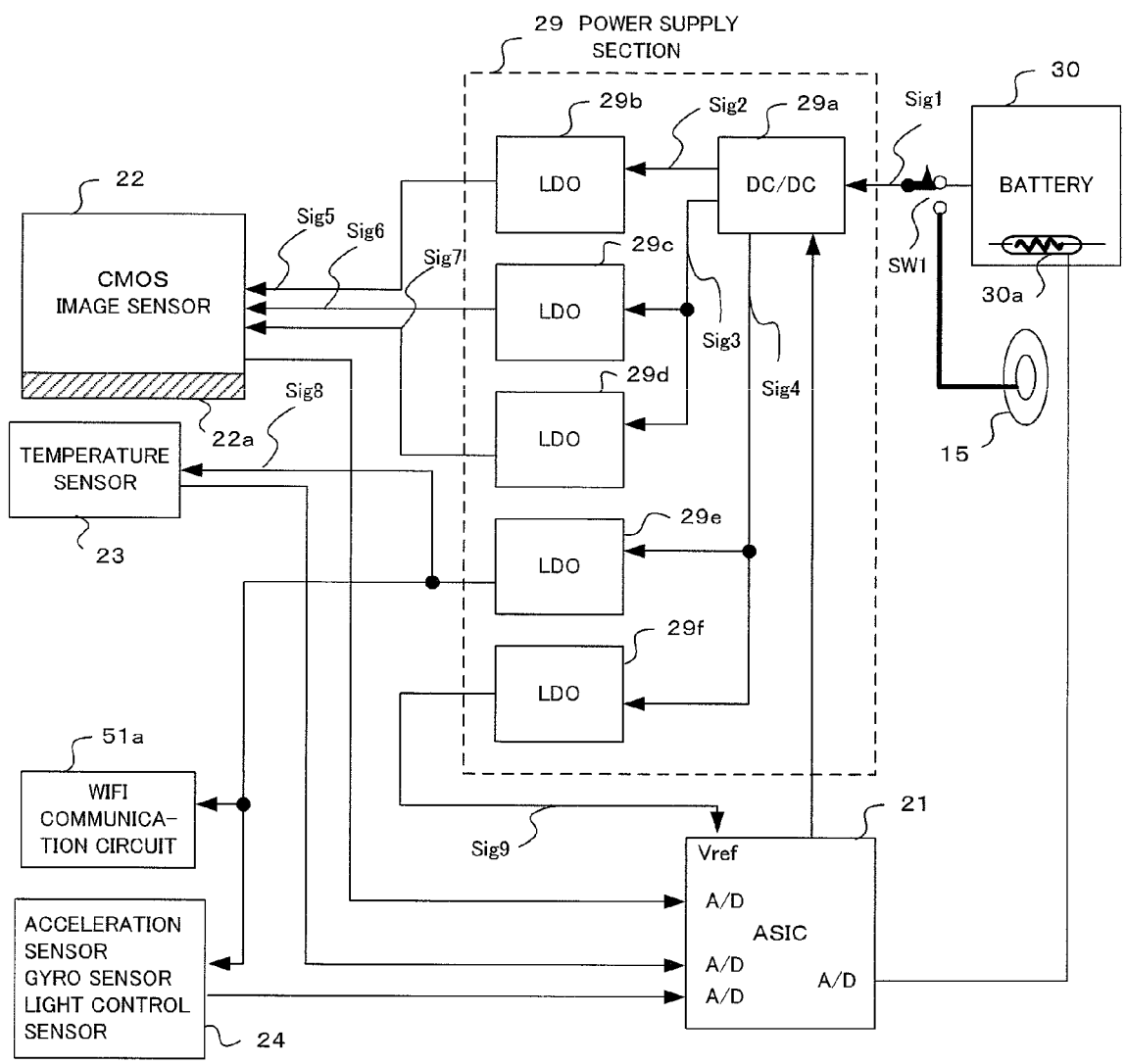
FIG. 4 is a block diagram showing a power supply section, and its peripheral circuits, of the camera of one embodiment of the present invention.

Next, the power supply section 29 and its peripheral circuitry will be described in detail using FIG. 4. A switch SW1 is arranged between the power supply section 29, power supply battery 30 and DC input terminal 15. Specifically, a fixed terminal is provided on the power supply section 29, while a movable terminal is provided on the power supply battery 30 and the DC input terminal 15, and a DC power supply voltage of either the power supply battery 30 or the DC input terminal 15 is supplied to the power supply section 29.

A DC/DC converter 29a and LDO (Low Drop Out) regulators 29b-29f are provided inside the power supply section 29.

The DC/DC converter 29a converts a first dc voltage Sig1 that has been provided from the power supply battery 30 or the DC input terminal 15 into second dc voltages Sig2-Sig4, and provides these dc voltages to the LDO regulators 29b-29f. Also, the DC/DC converter 29a is connected to the ASIC 21, and switches between an operating state and a halted state as well as redirecting output of the DC/DC converter 29a in accordance with control commands from the ASIC 21. Specifically, the second dc voltages Sig2-Sig4 are output to one or a plurality of the LDO regulators 29b-29f in accordance with instructions from the ASIC 21.

The second dc voltages Sig2-Sig4 are made differing voltages, but they may also be the same voltage. At least some of the second dc voltages Sig2-Sig4 are voltages appropriate for predicted noise level etc. of the CMOS image sensor 22 and are varied in accordance with instructions from the CPU 21g within the ASIC 21, as will be described later using FIG. 5A-FIG. 5F, FIG. 6A and FIG. 6B.

The second dc voltage Sig2 is input from the DC/DC converter 29a to the LDO regulator 29b, and the dc voltage Sig5 is output to the CMOS image sensor 22. Also, the second dc voltage Sig3 is input from the DC/DC converter 29a to the LDO regulators 29c and 29d, and the dc voltages Sig6 and Sig7 are output to the CMOS image sensor 22.

The CMOS image sensor 22 is supplied with dc voltage Sig5, dc voltage Sig6 and dc voltage Sig7, and circuits that are supplied with Sig5, among these dc voltages, are more susceptible to the influence of noise compared to those circuits to which Sig6 and Sig7 are supplied.

Also, the LDO regulator 29e is input with second dc voltage Sig4 from the DC/DC converter 29a, and outputs a dc voltage Sig8 to the temperature sensor 23, the WIFI communication section 51a and the sensor group 24. The LDO regulator 29f is also input with the second dc voltage Sig4 from the DC/DC converter 29a, and outputs the dc voltage Sig9 to the ASIC 21.

In this way, the DC/DC converter 29a of this embodiment converts to voltages (dc voltages Sig2-Sig4) that have been designated based on control signals from the CPU 21g within the ASIC 21, and outputs these voltages. Also, the LDO regulators 29b-29f receive outputs of the DC/DC converter 29a, and supply constant voltages to the CMOS image sensor 22.

Figure 5A:
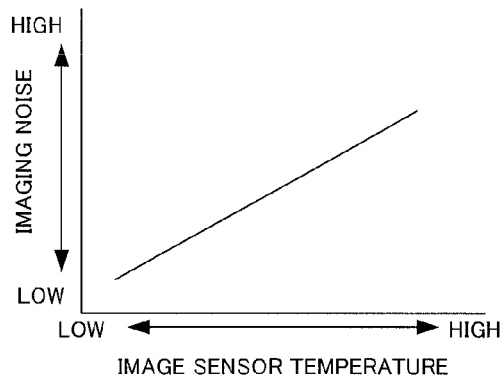
FIG. 5A-FIG. 5F are graphs showing characteristics of the camera of one embodiment of the present invention, with FIG. 5A being a graph showing variation in imaging noise with respect to image sensor temperature, FIG. 5B being a graph showing a relationship between imaging noise and LDO output noise, FIG. 5C being a graph showing a relationship between imaging noise and dark current (IOB), FIG. 5D being a graph showing a relationship between LDO input potential difference and LDO output noise, FIG. 5E being a graph showing a relationship between LDO input potential difference and LDO power consumption, and FIG. 5F being a drawing for describing that imaging noise results from addition of noise ascribable to temperature of the image sensor and LDO output noise.

Next, imaging noise etc. of the image sensor (CMOS image sensor 22) will be described using FIG. 5A-FIG. 5F. FIG. 5F is a graph showing a relationship between image sensor temperature and imaging noise. As shown in FIG. 5F, imaging noise is made up of noise $N_{Th}$ that is attributable to temperature of the image sensor 22, and power supply noise $N_{LDO}$ that is attributable to the LDO regulators 29b-29f. FIG. 5A shows variation in imaging noise with respect to temperature of the image sensor. As will be understood from looking at FIG. 5A, imaging noise increases with increase in temperature of the image sensor.

Figure 5B:
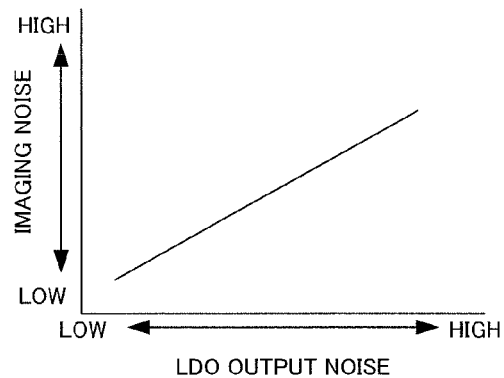
Figure 5C:
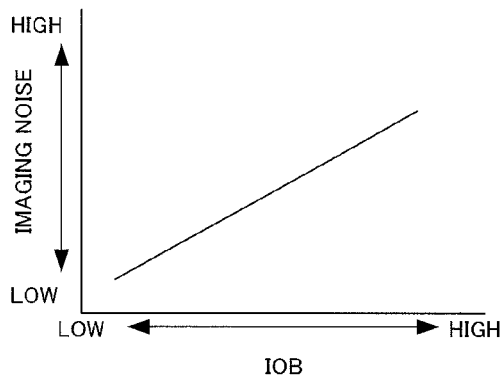

FIG. 5B shows variation in imaging noise with respect to output noise of the LDO regulators 29b-29f. As will be understood from looking at FIG. 5B, imaging noise increases with increase in output noise of the LDO regulators FIG. 5C shows variation in imaging noise with respect to dark current IOB of the image sensor (CMOS image sensor 22). As will be understood from looking at FIG. 5C, imaging noise increases with increase in dark current IOB of the image sensor.

Figure 5D:
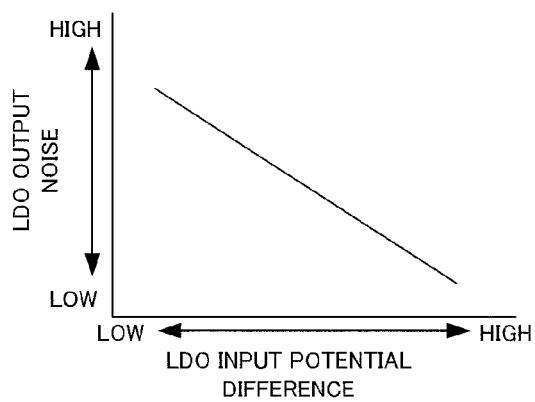

FIG. 5D shows variation in LDO output noise with respect to input potential difference of the LDO regulators 29b-29f. As will be understood from looking at FIG. 5D, LDO output noise reduces as LDO input potential difference increases.

Figure 5E:
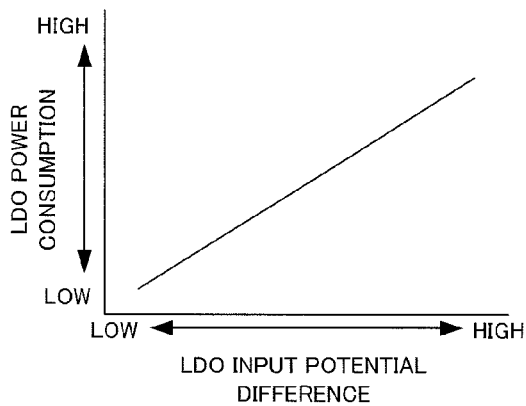
Figure 5F:
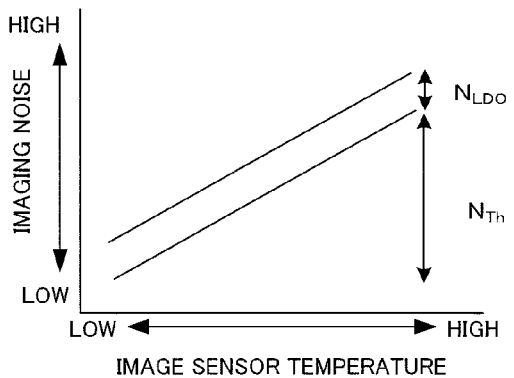

FIG. 5E shows variation in LDO power consumption with respect to LDO input potential difference of the LDO regulators 29b-29f. As will be understood from looking at FIG. 5E, LDO power consumption also increases as LDO input potential difference increases.

There is thus a tendency for imaging noise to increase if the temperature of the image sensor (CMOS image sensor 22) increases, or if the dark current IOB increases (refer to FIG. 5A and FIG. 5C). Also, imaging noise increases with increase in LDO output noise (refer to FIG. 5B), and this LDO output noise is reduced if the LDO input potential difference is made larger (refer to FIG. 5D). Accordingly, LDO output noise is reduced by increasing the LDO input potential difference, and as a result the imaging noise is reduced.

By raising the ambient temperature of the image sensor, or increasing the dark current IOB, in a situation where imaging noise is increased, it is possible to lower image sensor noise by increasing the LDO input potential difference. To increase the LDO input potential difference, it is necessary to increase the output voltages (Sig2-Sig4) of the DC/DC converter 29a. However, if LDO input potential difference is increased, they will be an increase in LDO power consumption, resulting in wasted power, as shown in FIG. 5E.

With this embodiment therefore, the temperature or dark current IOB of the image sensor is measured and noise is predicted based on this measurement result, and the DC/DC converter 29a is controlled from the ASIC 21 based on this predicted noise so as to give an optimum LDO input potential difference. As a result, imaging noise becomes a specified value or less, and it is also possible to prevent LDO power consumption becoming excessive.

Figure 6A:
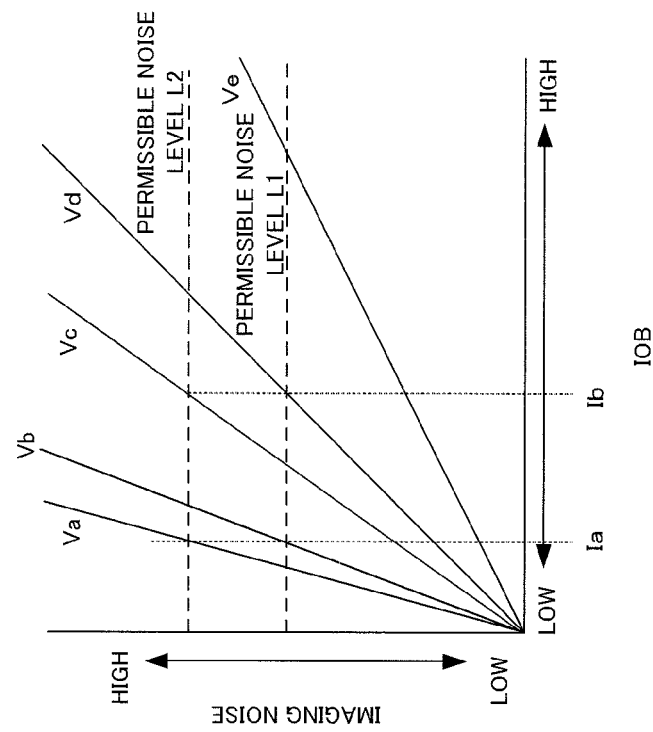
FIG. 6A is a graph showing a relationship between image sensor temperature and imaging noise of a camera of one embodiment of the present invention.

Output voltage control of the DC/DC converter 29a will now be described using FIG. 6A and FIG. 6B. FIG. 6A shows variation in imaging noise with respect to image sensor temperature, with Va-Ve representing LDO input potential difference (output voltages of the DC/DC converter 29a) (where Va<Vb<Vc<Vd<Ve). For example, with a permissible imaging noise level L1, then in the case of temperature Ta of the image sensor, the LDO input potential difference may be Vb, while in the case where the temperature of the image sensor is Tb the LDO input potential difference may be raised to Vd. In the case of a permissible imaging noise level L2, then in the case of temperature Ta of the image sensor, the LDO input potential difference may be Va, and in the case where the temperature of the image sensor is raised to Tb the LDO input potential difference may be raised to Vc.

Figure 6B:
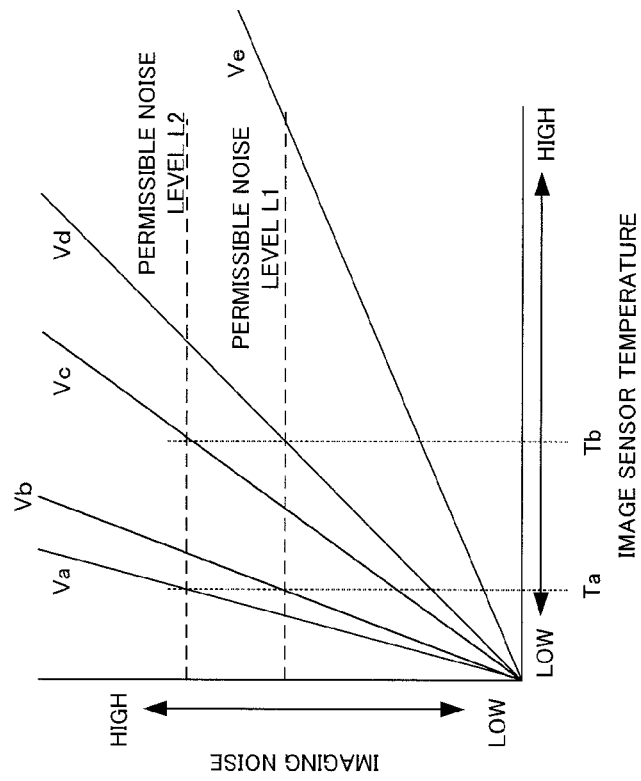
FIG. 6B is a graph showing a relationship between dark current (IOB) and imaging noise.
Figure 8:
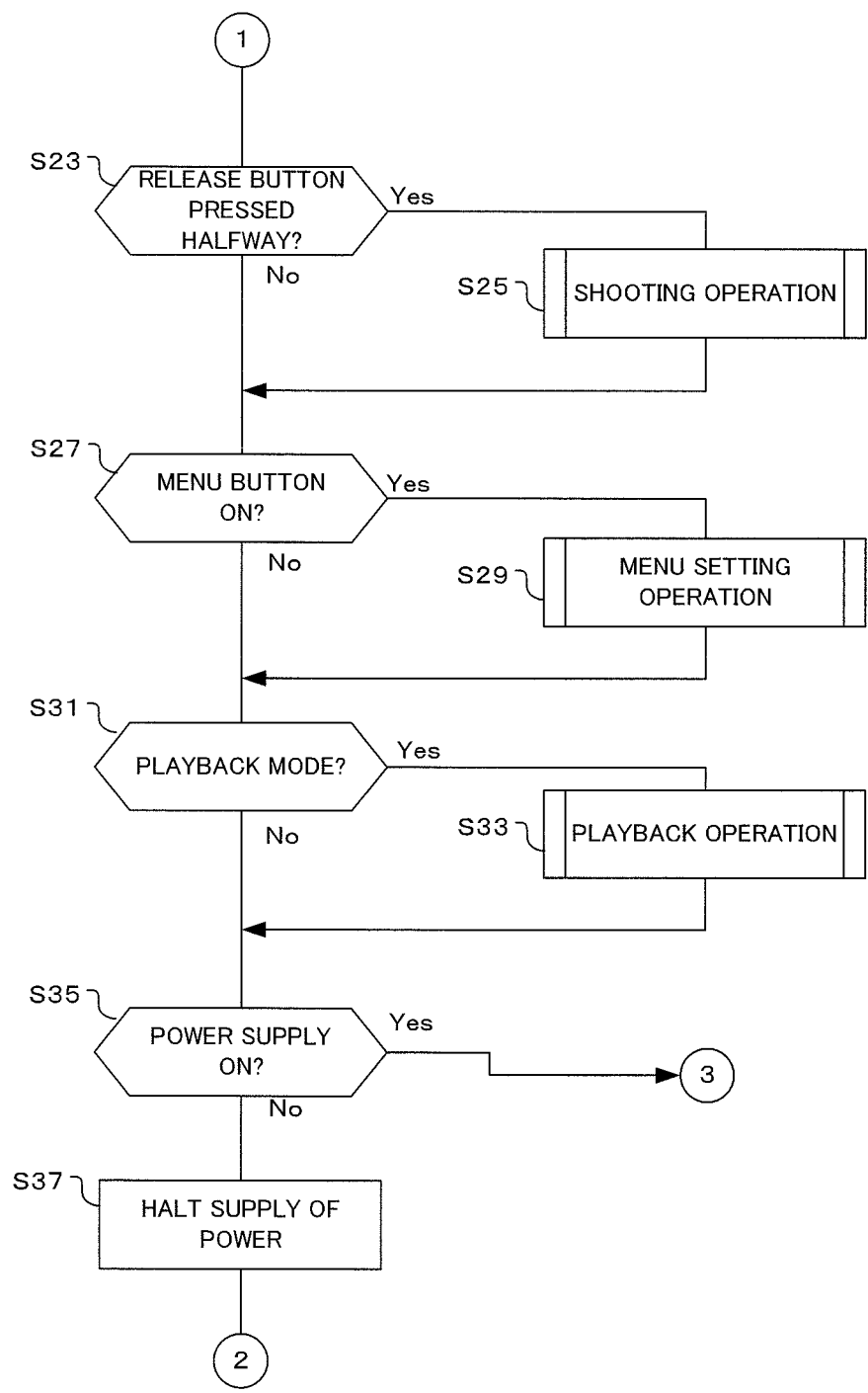
FIG. 8 is a flowchart showing operation of the camera of one embodiment of the present invention.

FIG. 6B shows variation in imaging noise with respect to image sensor dark current IOB, with Va-Ve representing LDO input potential difference (where Va<Vb<Vc<Vd<Ve). For example, with a permissible imaging noise level L1, then in the case where the dark current IOB is Ia, the LDO input potential difference may be Vb, and in the case where the dark current IOB is Ib the LDO input potential difference may be raised to Vd. In the case of a permissible imaging noise level L2, then in the case where the dark current IOB is Ia, the LDO input potential difference may be Va, and in the case where the dark current IOB is Ib the LDO input potential difference may be raised to Vc.

In this way, with this embodiment, imaging noise level of the image sensor is predicted based on temperature or dark current of the image sensor. Temperature of the image sensor is detected based on a temperature measurement signal of the temperature sensor 23, and dark current of the image sensor is detected based on signals from a region of an OB section 22a of the CMOS image sensor 22

Also, with this embodiment, as was described using FIG. 6A and FIG. 6B, the LDO input potential difference is controlled, based on predicted noise, so that imaging noise is less than or equal to a permitted level. Regulation of the LDO input potential difference is carried out by the ASIC 21 controlling the output voltages of the DC/DC converter 29a.

Next, operation of this embodiment will be described using the flowcharts shown in FIG. 7 to FIG. 11. These flowcharts also include the flowcharts shown in FIG. 12 to FIG. 17, which the CPU 21g executes in accordance with programs stored in the flash memory 34.

If the flowchart shown in FIG. 7 is entered, the CPU 21g first determines whether or not the power supply is on (S1). Specifically, operating state of the power supply button 3 is detected by the switch section 28, and determination is based on this detection. If the result of this determination is that the power supply is off, a sleep state is entered (S3). In this sleep state the camera body enters a reduced power consumption mode and only detection of operating state of specified operating members, such as the power supply button 3, is possible, and in the event that a specified operating member, such as the power supply button 3, is operated the sleep state is released.

In the event that the result of determination by the CPU 21g in step S1 was that the power supply was on, or if the sleep state of step S3 was released, supply of power commences (S5). In this step, the power supply section 29 supplies power to each section within the camera body 1.

If the CPU 21g has commenced supply of power, reading out of shooting mode, shooting conditions and lens information is next carried out (S7). In this step, readout is performed for shooting mode that has been set using the mode dial 8, shooting conditions that have been set on menu screens, lens information relating to the photographing lens 41 within the lens barrel 18 etc.

Once the CPU 21g has read out the shooting mode etc. in step S7, it is next determined whether or not there is live view (LV) display (S9). In this step, whether live view display has been selected or playback display has been selected is determined based on how a menu screen is being selected. In the case where playback display or a menu screen is being selected, the result of determination in step S9 becomes No.

If the result of determination by the CPU 21g in step S9 was live view display, live view voltage calculation and setting is carried out (S11). Here, noise level of the CMOS image sensor 22 is predictably calculated, and live view voltage calculation and setting is carried out based on this result. Specifically, temperature or dark current IOB of the image sensor is obtained (equivalent to predictive calculation of noise level), an LDO input potential difference that results in a permissible noise level for live view display (for example, in the examples of FIG. 6A and FIG. 6B, permitted noise level L1) is obtained, and setting of the output voltage of the DC/DC converter 29a is carried out so as to give this LDO input potential difference. Detailed operation of the live view voltage calculation and setting is omitted, but processing similar to the flow in FIG. 10 and FIG. 11 may be carried out. However, the permitted noise level can be higher at the time of live view display than at the time of shooting.

Once the CPU 21g has carried out LV voltage calculation and setting in step S11, exposure calculation is next carried out (S13). In this step, subject brightness is calculated based on image signals from the CMOS image sensor 22, and an electronic shutter speed value etc. that will give optimal brightness when performing live view display is calculated based on this subject brightness.

Once the CPU 21g has carried out exposure calculation, imaging is commenced (S15). In this step, the CMOS image sensor 22 commences imaging, and image signals are read out at time intervals corresponding to a frame rate.

Once the CPU 21g has commenced imaging, live view display is commenced (S17). In this step, a live view image is displayed on the rear surface panel 14 or the EVF 2, on the basis of image signals that have been read out from the CMOS image sensor 22. As will be described later, if the result of determination in step S35 is that the power supply is on, step S7 is returned to and the above-described processing is repeated, to carry out imaging using the CMOS image sensor 22 and update the live view display.

If the result of determination by the CPU 21g in step S9 was not live view display, constant voltage setting is performed while waiting (S19). In this case, since live view is not carried out, it is either not necessary to apply voltages to the CMOS image sensor 22, or only minimum voltages are applied (Sig5-Sig7). Also, respectively required voltages are applied to the temperature sensor 23, WIFI communication section 51a, sensor group 24, and ASIC 21.

If the CPU 21g has carried out low voltage setting while standing by in step S19, or if live view display has been carried out in step S17, shooting information display is next carried out (S21). Here, shooting mode and shooting conditions etc. are displayed on the rear surface monitor 14 or the EVF 2.

Once the CPU 21g has carried out shooting display, it is next determined whether or not the shutter release button has been pressed down half way (S23). Here it is determined by the switch section 28 whether or not the shutter release button 4 has been pressed down half way. If the result of this determination is that the shutter release button 4 has been pressed down halfway, a shooting operation is carried out (S25). In this step, it is further determined whether or not the shutter release button 4 has been pressed further from half way to being fully pressed, and if it is determined that it is being pressed down fully an image is acquired and stored in the storage medium 35. Detailed operation of this shooting operation will be described later using FIG. 9.

Once the CPU 21g has carried out the shooting operation in step S25, or if the result of determination in step S23 was that the shutter release button 4 was not pressed down half way, it is next determined whether or not the menu button 12 is on (S27). In this step it is determined by the switch section 28 whether or not the menu button 12 has been pressed.

If the result of determination in step S27 is that the menu button is on, the CPU 21g carries out a menu setting operation (S29). In this step, a menu screen is displayed on the rear surface panel 14 or the like, and update to shooting conditions etc. is carried out in response to operation of the cross-shaped button 9, OK button 10 etc.

If the CPU 21g has carried out a menu setting operation in step S29, or if the result of decision in step S27 was that the menu button was not on, it is next determined whether or not the mode dial 8 has been set to playback mode (S31). In this step the state of the mode dial 8 is detected by the switch section 28, and it is determined whether or not the dial is indicating playback mode.

If the result of determination in step S31 was that the mode dial 8 was set to playback mode, a playback operation is carried out (S33). In this step, image data for an image that has been designated by the user is read out from the storage medium 35, and subjected to playback display on the rear surface panel 14 or the EVF 2.

Once the CPU 21g has carried out a playback operation in step S33, or if the result of determination in step S31 was that the playback button was not on, it is next determined whether or not the power supply is on (S35). In this step it is determined by the switch section 28 whether or not the power supply button 3 is in an on state. If the result of this determination is that the power supply button 3 is in an on state, processing returns to step S7, and the previously described operation is executed.

If the result of determination in step S35 was that the power supply was not on, the CPU 21g stops supply of power (S37). In this step, the power supply section 29 stops the supply of power. Once supply of power has been stopped processing returns to step S3 and a sleep state is entered.

Figure 9:
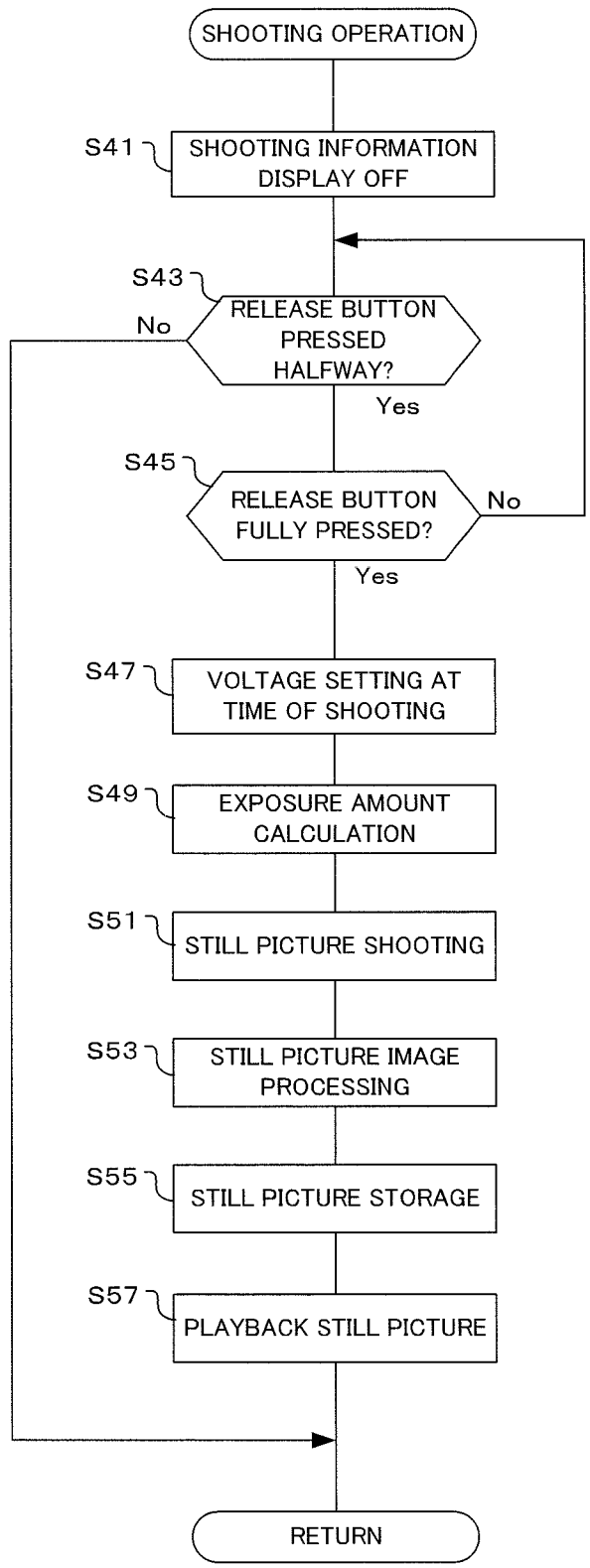
FIG. 9 is a flowchart showing operation of the camera of one embodiment of the present invention.

Next, detailed operation of the shooting operation shown in step S25 will be described using FIG. 9. Once the shooting operation is entered, the CPU 21g first turns off the shooting information display (S41). Shooting information is displayed in step S21, but in this step the display of shooting information is removed in order for the photographer to be able to concentrate on a subject during shooting.

Once the CPU 21g has turned off shooting information display, it is next determined whether or not the shutter release button 4 has been pressed down half way (S43). In this step the operating state of the shutter release button 4 is determined by the switch section 28. The fact that the shutter release button 4 has been pressed down half way is detected in step S23, but in this step it is determined whether or not the half pressing of the shutter release button 4 continues. If the result of this determination is that the shutter release button 4 is not being pressed down halfway, the shooting operation flow is terminated and the originating processing flow is returned to.

On the other hand, if the result of determination in step S43 is that the shutter release button has been pressed down half way, it is next determined whether or not the shutter release button has been pressed down fully (S45). Here it is determined by the switch section 28, whether or not the shutter release button 4 has being pressed down further from the half pressed state to enter a fully pressed state. If the result of this determination is that the shutter release button 4 has not been pressed down fully, processing returns to step S43.

On the other hand, if the result of determination in step S45 is that the shutter release button has been pressed down fully, shooting time voltage setting is carried out by the CPU 21*g* (S47). Here, noise level of the CMOS image sensor 22 is predictively calculated, and shooting time voltage setting is carried out based on this result. Specifically, temperature or dark current IOB of the image sensor is obtained (equivalent to predictive calculation of noise level), an LDO input potential difference that results in a permissible noise level at the time of shooting (for example, in the examples of FIG. 6A and FIG. 6B, permitted noise level L2) is obtained, and setting of the output voltage of the DC/DC converter 29*a* is carried out so as to give this LDO input potential difference. Detailed operation of this shooting time voltage setting will be described later using FIG. 10 and FIG. 11.

Once the CPU 21*g* has carried out shooting time voltage setting, exposure calculation is carried out next (S49). Here, electronic shutter speed value and aperture value etc. to achieve optimal exposure are calculated using subject brightness that was calculated in step S13 (refer to FIG. 7).

Once the CPU 21*g* has carried out exposure calculation, still picture shooting is carried out next (S51). In this step, exposure control is carried out with a shutter speed value and an aperture value etc., using exposure control values that were calculated in step S49, and once exposure to the CMOS image sensor 22 has been completed image signals for a still picture are read out.

Once the CPU 21*g* has carried out still picture shooting, next still picture image processing is carried out (S53). In this step, image processing of image signals for a still picture that have been read out from the CMOS image sensor 22 is carried out by the image processing section 21*b*.

Once the CPU 21*g* has carried out still picture image processing, still picture storage is next carried out (S55). In this step, image data for a still image that has been subjected to image processing by the image processing section 21*b* is stored in the storage medium 35. Once still picture storage has been carried out, the still picture is played back (S57). Here, a still picture that was stored in step S55 is displayed on the rear surface panel 14 or the like for a specified time.

Once the CPU 21*g* has carried out the still picture playback in step S57, or if the result of determination in step S43 was that the shutter release button was not pressed down halfway, the originating processing flow is returned to.

In this way, with the camera operation of this embodiment, at the time of live view display and at the time of a shooting operation predictive calculation of noise level is carried out, and input voltage of the LDO regulators is varied by controlling the DC/DC converter 29*a* in accordance with the predicted noise level so that imaging noise is a permissible level or less (refer to S11 and S47).

Detailed operation of the shooting time voltage setting of step S47 will now be described using FIG. 10 and FIG. 11. With this embodiment, noise at the time of shooting is predicted, and there are two methods for carrying out this prediction, namely a method for predicting based on ambient temperature of the CMOS image sensor 22, and a method for predicting based on dark current IOB of the CMOS image sensor 22. Prediction may also be carried out using a combination of the above described two predicting methods, but the method of predicting based on temperature of the CMOS image sensor 22 will be described using the flowchart shown in FIG. 10, and the method of predicting based on dark current IOB will be described using the flowchart shown in FIG. 11.

Figure 10:
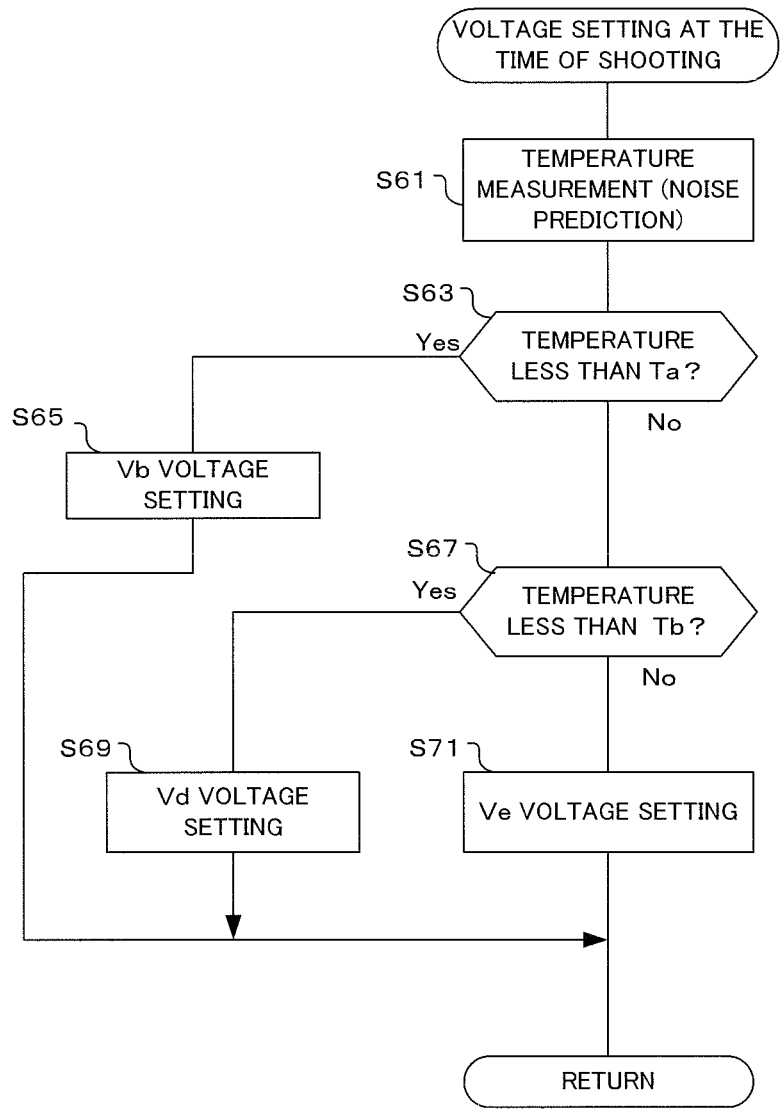
FIG. 10 is a flowchart showing a voltage setting operation at the time of shooting, of the camera of one embodiment of the present invention.

If the flow for voltage setting at the time of shooting shown in FIG. 10 is entered, the CPU 21*g* carries out temperature measurement (S61). In this step, for noise prediction, the CPU 21*g* acquires a temperature measurement signal from the temperature sensor 23 that is arranged close to the CMOS image sensor 22.

Once temperature measurement has been performed, the CPU 21*g* next determines whether or not the temperature is less than Ta (S63). In this step, determination as to whether or not the temperature is less than Ta is carried out based on the temperature measurement signal that was acquired in step S61. If the result of this determination is that it is less than temperature Ta, Vb voltage is set (S65). In this step, the output voltage of the DC/DC converter 29*a* (input voltage of the LDO regulator 29*b*) is set to voltage Vb. A more stringent level L1 is set as the permitted noise level at the time of shooting, and the input voltage of the LDO regulator 29*b* is set in accordance with this.

If the result of determination in step S63 is not that the temperature is less than Ta, the CPU 21*g* next determines whether or not it is less than temperature Tb (S67). In this step, determination as to whether or not the temperature is less than Tb is carried out based on the temperature measurement signal that was acquired in step S61. If the result of this determination is that it is less than temperature Tb, Vd voltage is set (S69). In this step, the output voltage of the DC/DC converter 29*a* (input voltage of the LDO regulator 29*b*) is set to voltage Vd.

On the other hand, if the result of determination in step S67 is not that the temperature is less than Tb (if it is greater than or equal to temperature Tb), the CPU 21*g* sets voltage Ve (S71). In this step, the output voltage of the DC/DC converter 29*a* (input voltage of the LDO regulator 29*b*) is set to voltage Ve.

Once the CPU 21*g* has carried out voltage setting in steps S65, S69, and S71, the originating processing flow is returned to.

Next, a method of setting input voltage of the LDO regulator by predicting noise based on dark current IOB will be described using the flowchart shown in FIG. 11.

Figure 11:
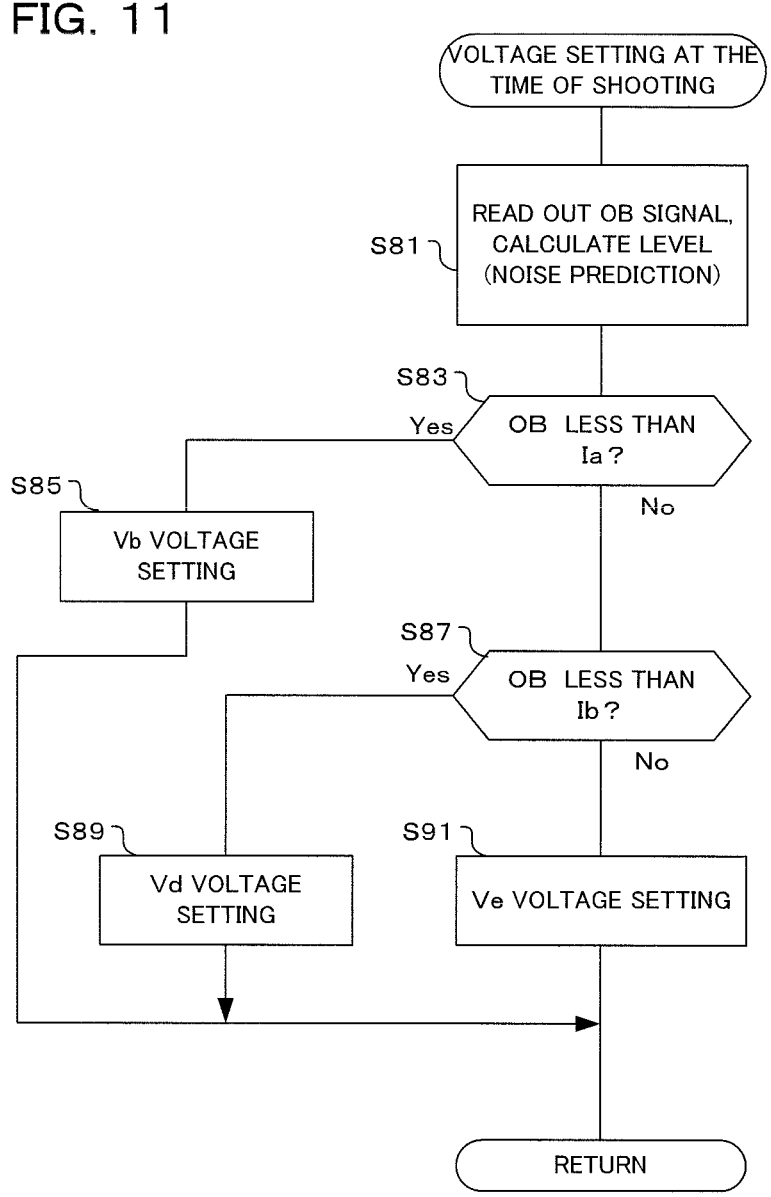
FIG. 11 is a flowchart showing a voltage setting operation at the time of shooting, of the camera of one embodiment of the present invention.

If the flow for voltage setting at the time of shooting shown in FIG. 11 is entered, the CPU 21*g* first reads an OB signal and calculates noise level (S81). In this step, for noise prediction, the CPU 21*g* acquires an OB signal from the OB region 22*a* of the CMOS image sensor 22.

Once the CPU 21*g* has read the OB signal and calculated noise level, it is next determined whether or not dark current IOB is less than Ia (S83). In this step, determination as to whether or not IOB is less than Ia is carried out based on the dark current IOB that was acquired in step S81. If the result of this determination is that dark current IOB is less than Ia, Vb voltage is set (S85). In this step, the output voltage of the DC/DC converter 29*a* (input voltage of the LDO regulator 29*b*) is set to voltage Vb. A more stringent level L1 is set as the permitted noise level at the time of shooting, and the input voltage of the LDO regulator 29*b* is set in accordance with this.

If the result of determination in step S83 is that dark current IOB is not less than Ia, the CPU 21*g* next determines whether or not dark current IOB is less than Ib (S87). In this step, determination as to whether or not IOB is less than Ib is carried out based on the dark current IOB that was acquired in step S81. If the result of this determination is that dark current IOB is less than Ib, Vd voltage is set (S89). In this step, the output voltage of the DC/DC converter 29*a* (input voltage of the LDO regulator 29*b*) is set to voltage Vd.

On the other and, if the result of determination in step S87 is that dark current IOB is not less than Ib (if it is greater than or equal to dark current Ib), the CPU 21*g* sets voltage Ve (S91). In this step, the output voltage of the DC/DC converter 29a (input voltage of the LDO regulator 29b) is set to voltage Ve.

Once the CPU 21g has carried out voltage setting in steps S85, S89, and S91, the originating processing flow is returned to.

In this way, with the voltage setting at the time of shooting of this embodiment, noise of the image sensor (CMOS image sensor 22) is predicted (S71, S81), and input voltage of the LDO regulator is controlled based on this prediction result. It is therefore possible to suppress increase in power consumption of the LDO regulator, together with reducing imaging noise of the image sensor.

Although temperature Ta, Tb and dark current Ia, Ib of the image sensor are made determination values in the flowcharts of FIG. 10 and FIG. 11, the number of determination values is not limited to two, and may be a single value, or three or more values.

Also, the flowcharts of FIG. 10 and FIG. 11 can be applied to the LV voltage calculation and setting of step S11 (refer to FIG. 7). In this case, a less stringent level L2 is set as the permitted noise level, and the input voltage of the LDO regulator 29b is set in accordance with this. Compared to the requirements for noise level of a stored image, noise level for a live view image is not as strict, and can be set in line with attempting to make power consumption loss small. As a result Va voltage setting may be performed in steps S65 and S85, and Vc voltage setting may be performed in steps S69 and S89.

Next, a modified example of the live view voltage calculation and setting in step S11 (FIG. 7) will be described using the flowchart shown in FIG. 12. With one embodiment of the present invention, imaging noise was predicted based on ambient temperature and dark current of the image sensor and voltage of the LDO regulator was set so as to achieve less than or equal to a permissible noise level. The permissible imaging noise also differs depending on the operating mode, and so the LDO regulator voltage may also be set depending on the operating mode. With this modified example, in the case of live view display, input voltage of the LDO regulator is varied in accordance with whether enlarged display is carried out, and whether display is on the rear surface panel 14 or on the EVF 2. With this modified example, the EVF 2 can be detached from the camera body 1, and an optical viewfinder can be attached in place of the removed EVF 2.

Figure 12:
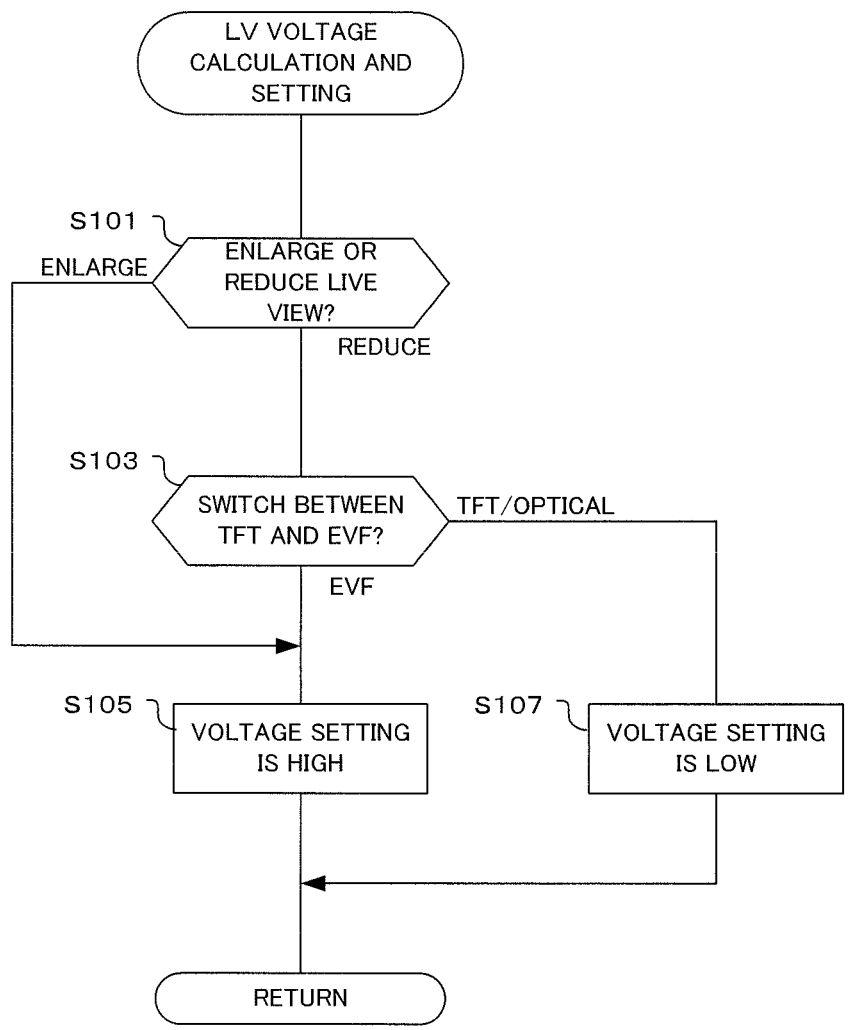
FIG. 12 is a flowchart showing a modified example of an LV voltage calculation and setting operation of the camera of one embodiment of the present invention.

If the flow for live view voltage calculation and setting shown in FIG. 12 is entered, the CPU 21g first determines whether live view is magnified or reduced (S101). For live view display an enlarged display mode can be selected on a menu screen or the like, and in this step it is determined whether or not enlarged display mode has been selected. In the flowcharts, reduction is returning to the size of normal live view display.

If the result of determination in step S101 is reduced display, the CPU 21g next determines switching between the rear surface panel (TFT) 14 and the EVF 2 (S103). In this step the operating state of the display switch button 7 is detected by the switch section 28 to perform the determination. There may be situations where an optical viewfinder is fitted in place of the EVF 2.

If the result of decision in step S103 was to switch to the EVF 2, or if the result of determination in step S101 was magnified live view display, the voltage setting by the CPU 21g sets a high voltage value such as Ve in FIG. 6A and FIG. 6B (S105). In this step, the input voltage of the LDO regulator is set to a high voltage compared to that which was set in step S107.

On the other and, if the result of determination in step S103 is to switch to the TFT or optical viewfinder, the CPU 21g sets a low voltage such as Va in FIG. 6A and FIG. 6B (S107). In this step, the input voltage of the LDO regulator is set to a low voltage compared to that which was set in step S105.

Once the CPU 21g has carried out setting of the input voltage of the LDO regulator in steps s105, and S107, the originating processing flow is returned to.

In this way, with the modified example of this embodiment, in the case of carrying out magnified live view display, the input voltage of the LDO regulator is set to a high voltage compared to the case of normal display. Generally, at the time of magnified live view display, since noise is easy to notice in an image, a permissible noise level is made small, and the input voltage of the LDO regulator is therefore made high.

First to fifth modified examples of the voltage setting at the time of shooting in step S47 (refer to FIG. 9) will now be described using FIG. 13 to FIG. 17. As has been described above, with the one embodiment of the present invention, imaging noise was predicted based on ambient temperature and dark current of the image sensor, and voltage of the LDO regulator was set so as to achieve less than or equal to a permissible noise level. The permissible imaging noise also differs depending on the operating mode, and so the LDO regulator voltage may also be set depending on the operating mode. With the first to fifth modified examples, when performing voltage setting at the time of shooting, input voltage of the LDO regulator is varied in accordance with the operating mode.

First, a first modified example of the voltage setting at the time of shooting in step S47 (refer to FIG. 9) will be described using FIG. 13. With this modified example, an operating mode is set, shooting conditions such as ISO sensitivity and subject brightness are noted, and input voltage of the LDO regulator is controlled based on these shooting conditions.

Figure 13:
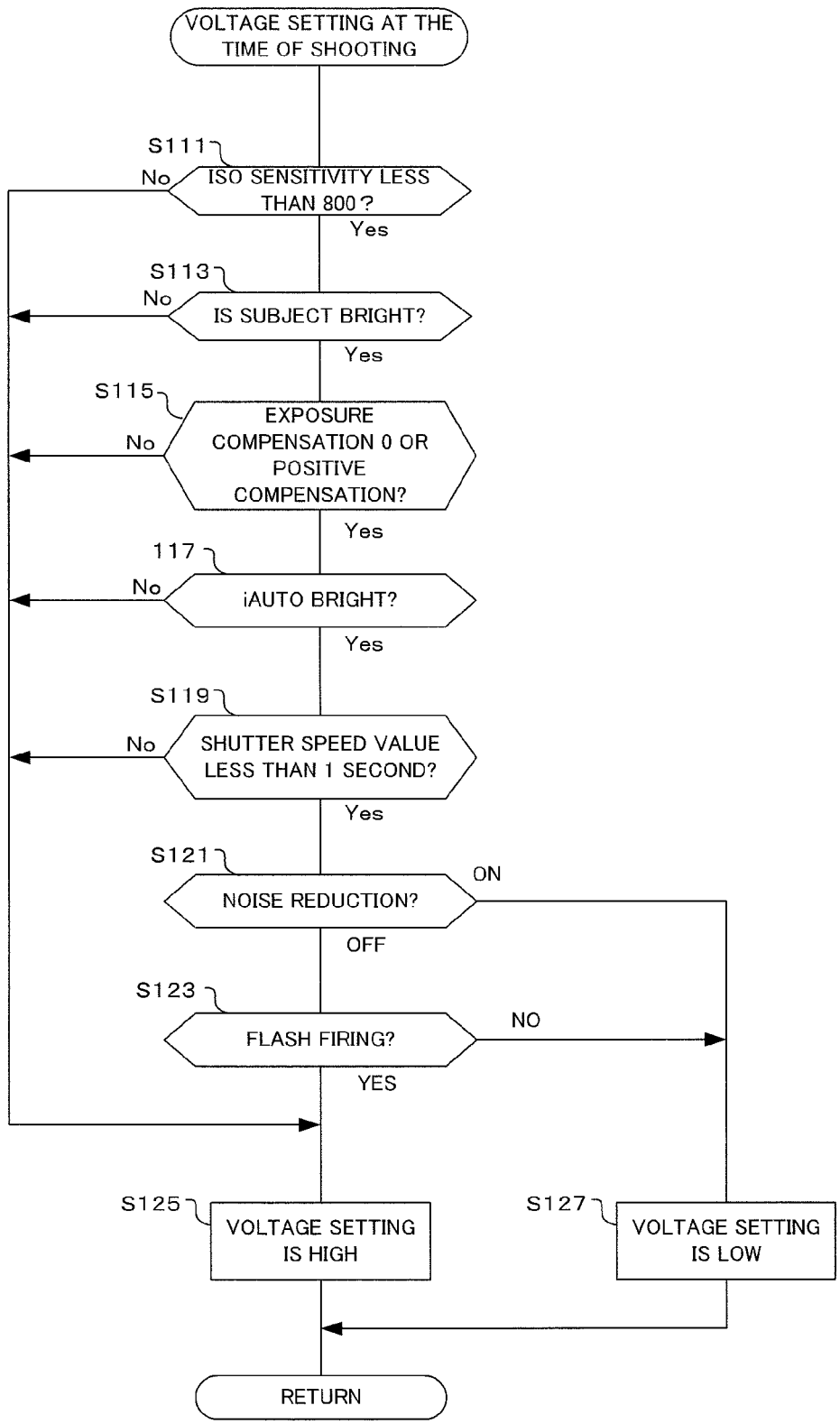
FIG. 13 is a flowchart showing a first modified example of a voltage setting operation at the time of shooting, of the camera of one embodiment of the present invention.

If the flow for voltage setting at the time of shooting shown in FIG. 13 is entered, the CPU 21g first determines whether or not the ISO sensitivity is below ISO 800 (S111). ISO sensitivity is set on a menu screen or the like, or automatically set in accordance with subject brightness. If the result of this determination is that the ISO sensitivity is not less than 800 (ISO sensitivity is greater than or equal to 800), voltage setting is made high (S125). In the case where ISO sensitivity is high, since noise is easy to notice in a subject image, a permissible noise level is made small, and the DC/DC converter 29a is therefore controlled to make input voltage of the LDO regulator high.

If the result of determination in step S111 is that the ISO sensitivity is less than 800, the CPU 21g next determines whether or not shooting subject brightness is bright (S113). Determination here uses the subject brightness that was used at the time of exposure calculation in step S49. If the result of this determination is that the shooting subject is not bright (the shooting subject is dark), voltage setting is made high (S125). In the case where the subject is dark, since noise is easy to notice in a subject image, a permissible noise level is made small, and the DC/DC converter 29a is therefore controlled to make input voltage of the LDO regulator high.

If the result of determination in step S113 is that the subject is bright, the CPU 21g next determines whether or not exposure compensation is 0 or positive compensation (S115). Exposure compensation is set on a menu screen or the like. If the result of this determination is that exposure compensation is not 0 or positive exposure compensation (if negative exposure compensation is to be carried out), voltage setting is made high (S125). In the case of carrying out negative exposure compensation, this is compensation that will tend to darken the screen overall, and since noise will be easy to notice in the subject image, a permissible noise level is made small, and the DC/DC converter 29a is therefore controlled to make input voltage of the LDO regulator high.

If the result of determination in step S115 was that exposure compensation is 0 or positive compensation, the CPU 21g next determines whether or not the subject is bright with iAuto (S117). iAuto is a type of shooting mode, and optimum exposure is automatically performed for a shot scene. In this step, it is determined whether or not shooting mode is set to iAuto, and that the shooting subject is bright. If the result of this determination is that it is iAuto and the shooting subject is not bright, voltage setting is made high (S125). In the case where iAuto is set and the shooting subject is dark, since noise is easy to notice in a subject image, a permissible noise level is made small, and the DC/DC converter 29a is therefore controlled to make input voltage of the LDO regulator high.

If the result of determination in step S117 is that iAuto is set and the subject is bright, the CPU 21g next determines whether or not shutter speed is less than one second (S119). A shutter speed value is calculated in step S13. If the result of this determination is that the shutter speed value is not less than one second (shutter speed is slower than one second), voltage setting is made high (S125). In the case where the shutter speed value is slow, since noise is easy to notice in a subject image, a permissible noise level is made small, and the DC/DC converter 29a is therefore controlled to make input voltage of the LDO regulator high.

On the other hand, if the result of determination in step S119 is that the shutter speed value is less than one second, the CPU 21g next determines whether or not noise reduction has been set (S121). Noise reduction is a mode for generating an image from which the effects of noise have been removed, by light shielding the image sensor using a mechanical shutter after shooting has been carried out and a first image signal has been read out, carrying out imaging with the image sensor shielded and reading out a second image signal, and then subtracting the second image signal from the first image signal. Noise reduction mode is set on a menu screen or the like.

If the result of determination in step S119 is that noise reduction is off, the CPU 21g next determines whether or not flash firing will be carried out (S123). The flash 16 fires when a subject is dark, or when manual setting has been performed. Regarding whether the flash fires or does not fire, this is determined automatically from subject brightness information in the case where flash mode is set to auto, while if the user has set to manual it is determined in accordance with whether the user has set to manually disable flash or set to forcibly fire the flash.

In the case where the result of determination in step S121 is that noise reduction is off, and the result of determination in step S123 is that flash firing is ON, voltage setting is made high (S125). In the case of the subject that may require flash firing, it is dark and noise reduction will not be carried out, and so it is easy to notice noise in a subject image. Therefore, in order to make a permissible noise level small, the DC/DC converter 29a is controlled to make input voltage of the LDO regulator high.

On the other hand, in the case where the result of determination in step S121 is that noise reduction is on, and the result of determination in step S123 is that the flash will not be fired, voltage setting is made low (S127). In this case, the subject is bright and noise will be difficult to notice in the subject image. Since there is no practical problem even if the permissible noise level is made high, the DC/DC converter 29a is controlled to make input voltage of the LDO regulator low, and power consumption loss is reduced.

Once the CPU 21g has carried out setting of the input voltage of the LDO regulator in step S125 or S127, the originating processing flow is returned to.

In this way, with the voltage setting at the time of shooting of this modified example, the input voltage of the LDO regulator is controlled based on shooting conditions such as ISO sensitivity and subject brightness. With this modified example, in the case of shooting conditions that may increase imaging noise of the image sensor (CMOS image sensor 22), the DC/DC converter 29a is controlled to make input voltage of the LDO regulator high, so that imaging noise is difficult to notice. On the other hand, in the case where there are not shooting conditions that will increase imaging noise of the image sensor, the LDO regulator input voltage is made low and power consumption loss is minimized.

With this modified example, ISO for the purposes of determination in step S111 is set to 800, and the shutter speed value is set to one second for the purpose of determination in step S119, but this is only an example, and they may be set to appropriate values accordingly in relation to imaging noise of the image sensor. Also, ISO sensitivity, subject brightness and exposure compensation etc. have been used as shooting conditions, but it is not necessary to determine all of these, and it is also possible to add other shooting conditions.

Next, a second modified example of the voltage setting at the time of shooting in step S47 (refer to FIG. 9) will be described using FIG. 14. With this modified example, an operating mode is set, shooting conditions such as image compression rate and image size are noted, and input voltage of the LDO regulator is controlled based on these shooting conditions.

Figure 14:
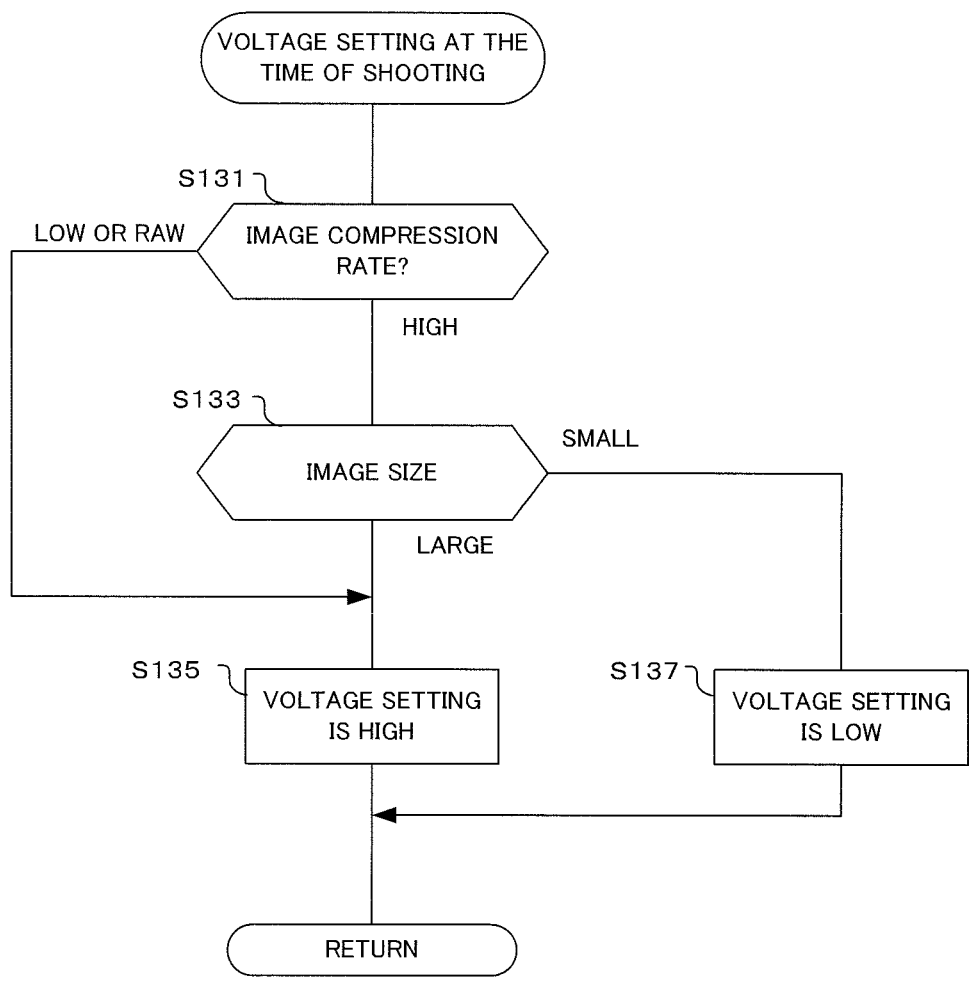
FIG. 14 is a flowchart showing a second modified example of a voltage setting operation at the time of shooting, of the camera of one embodiment of the present invention.

If the flow for voltage setting at the time of shooting shown in FIG. 14 is entered, the CPU 21g first determines whether Image compression rate is higher or lower than a specified image compression rate, or if RAW data is used (S131). Since image compression rate etc. is set on a menu screen, in this step determination is based on this setting.

If the result of determination in step S131 is that image compression rate is high, the CPU 21g determines whether image size is larger or smaller than a specified size (S133). Since image size is set on a menu screen, in this step determination is based on this setting.

If the result of determination in step S131 is that image compression rate is low, or that RAW data is used, or if the result of determination in step S133 is that image size is large, voltage setting is made high (S135). In cases where the image compression rate is low, RAW data is used, or image size is large, since noise is easy to notice in a subject image, a permissible noise level is made small, and the DC/DC converter 29a is therefore controlled to make input voltage of the LDO regulator high.

On the other hand, if the result of determination in step S133 is that image size is small, the CPU 21g makes the voltage setting low (S137). In this case, since image compression rate is high and image size is small, it is difficult to notice noise in the subject image. Since there is no practical problem even if the permissible noise level is made high, the DC/DC converter 29a is controlled to make input voltage of the LDO regulator low, and power consumption loss is reduced.

Once the CPU 21g has carried out setting of the input voltage of the LDO regulator in step S135 or S137, the originating processing flow is returned to.

In this way, with the voltage setting at the time of shooting of this modified example also, the input voltage of the LDO regulator is controlled based on shooting conditions such as image compression rate and image size. With this modified example also, in the case of shooting conditions that will increase imaging noise of the image sensor (CMOS image sensor 22), the DC/DC converter 29a is controlled to make input voltage of the LDO regulator high, so that imaging noise is difficult to notice. On the other hand, in the case where there are not shooting conditions that will increase imaging noise of the image sensor, the LDO regulator input voltage is made low and power consumption loss is minimized.

The image compression rate for the purpose of detection in step S131 and the image size for the purpose of detection and step S133 may be values for an extent at which imaging noise of the image sensor (CMOS image sensor 22) is noticeable. Also, image compression rate, RAW data and image size have been used as shooting conditions, but it is not necessary to determine all of these and it is also possible to add other shooting conditions or to omit some of these shooting conditions.

Next, a third modified example of the voltage setting at the time of shooting in step S47 (refer to FIG. 9) will be described using FIG. 15. With this modified example, an operating mode is set, operating mode and art filter and shooting mode are noted, and input voltage of the LDO regulator is controlled based on this operating mode.

Figure 15:
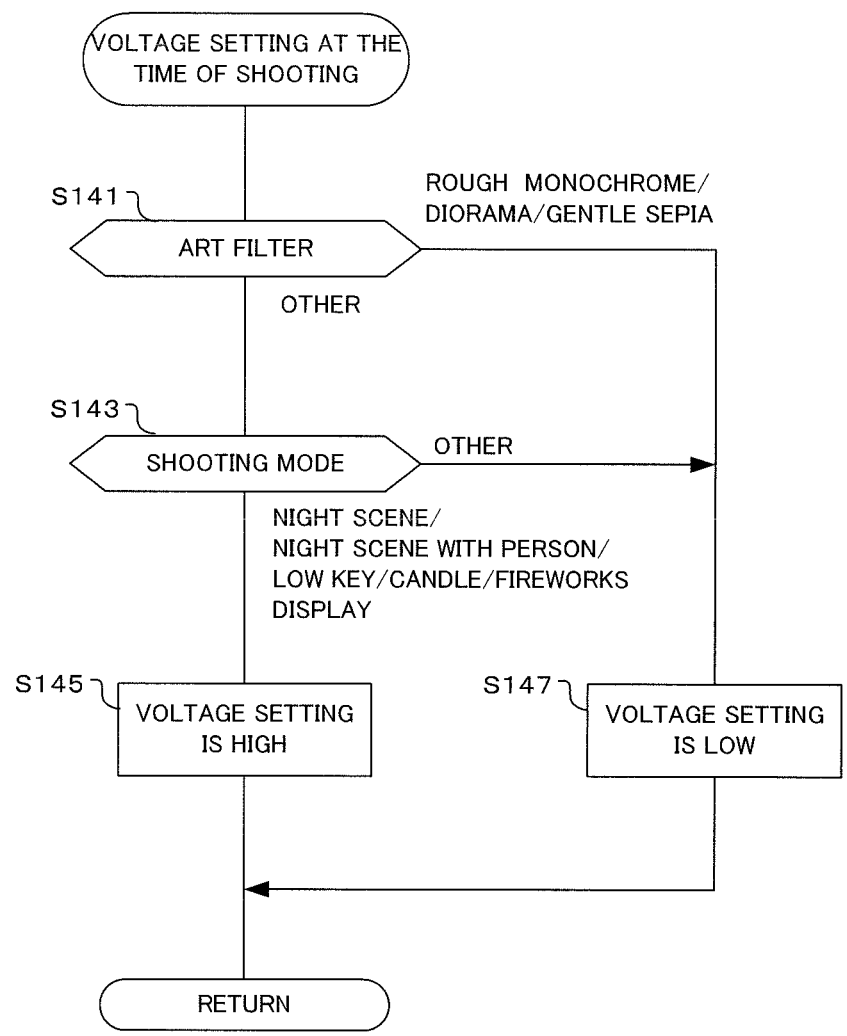
FIG. 15 is a flowchart showing a third modified example of a voltage setting operation at the time of shooting, of the camera of one embodiment of the present invention.

If the flow for voltage setting at the time of shooting shown in FIG. 15 is entered, the CPU 21g first determines the type of art filter (S141). Here, since art filter mode is set on a menu screen etc, in this step determination is in response to this setting. It is determined whether the art filter mode is other than rough monochrome, Diorama or gentle sepia. Rough monochrome is processing to superimpose a previously created noise pattern on the subject image. Diorama carries out gradual blurring processing in accordance with distance from the center, with an AF target of the original image as the center. Gentle sepia carries out processing to blur the entire image with a sepia tone. These three types of art filter mode superimpose noise or carry out blurring processing, and therefore have a characteristic that imaging noise is less noticeable.

If the result of determination in step S141 was not one of the above three types of art filter mode, the CPU 21g next determines whether the shooting mode is either of a night scene, night scene with person, low key, candle, or fireworks display shooting mode, or whether it is other than one of these shooting modes (S143). Either of these shooting modes is suitable for shooting a dark subject. Low key is a shooting mode that gives a somber mood without losing the gradation of dark portions.

If the result of determination in step S143 was that the shooting mode was one of the above 5 types, such as night scene, voltage setting is made high (S145). In a case where processing that makes imaging noise less noticeable is not carried out as a characteristic of the art filter mode, or in a case of a shooting mode that shoots a dark subject (or a case of processing to darken a subject) since noise is easy to notice in a subject image, a permissible noise level is made small, and the DC/DC converter 29a is therefore controlled to make input voltage of the LDO regulator high.

On the other hand, if the result of determination in step S141 is that one of the above described three types of art filter mode, such as rough monochrome, has been set, or if the result of determination in step S143 is that another shooting mode has been set, the CPU 21g makes the voltage setting low (S147). In this case, since an art filter that makes imaging noise less noticeable, such as rough monochrome, is set, or another shooting mode is set which is not intended for a particularly dark subject, it is difficult to notice noise in the subject image. Since there is no practical problem even if the permissible noise level is made high, the DC/DC converter 29a is controlled to make input voltage of the LDO regulator low, and power consumption loss is reduced.

Once the CPU 21g has carried out setting of the input voltage of the LDO regulator in step S145 or S147, the originating processing flow is returned to.

In this way, with the voltage setting at the time of shooting of this modified example also, the CPU 21g controls the input voltage of the LDO regulator based on an operating mode, such as art filter mode or shooting mode. With this modified example also, in the case of shooting conditions that will increase imaging noise of the image sensor (CMOS image sensor 22), the DC/DC converter 29a is controlled to make input voltage of the LDO regulator high, so that imaging noise is difficult to notice. On the other hand, in the case where there are not shooting conditions that will increase imaging noise of the image sensor, the LDO regulator input voltage is made low and power consumption loss is minimized.

The art filter modes of step S131 are not limited to the three types such as rough monochrome. Also, the shooting modes of step S143 are not limited to the five types such as night scene mode, and may be any mode that makes imaging noise of the image sensor (CMOS image sensor 22) less noticeable as a result of image processing. It is also possible to add other operating modes to these operating modes, or to omit some of the operating modes.

Next, a fourth modified example of the voltage setting at the time of shooting in step S47 (refer to FIG. 9) will be described using FIG. 16. With this modified example, an operating mode is set, a still image or movie is noted, and input voltage of the LDO regulator is controlled in accordance with the still image or movie.

Figure 16:
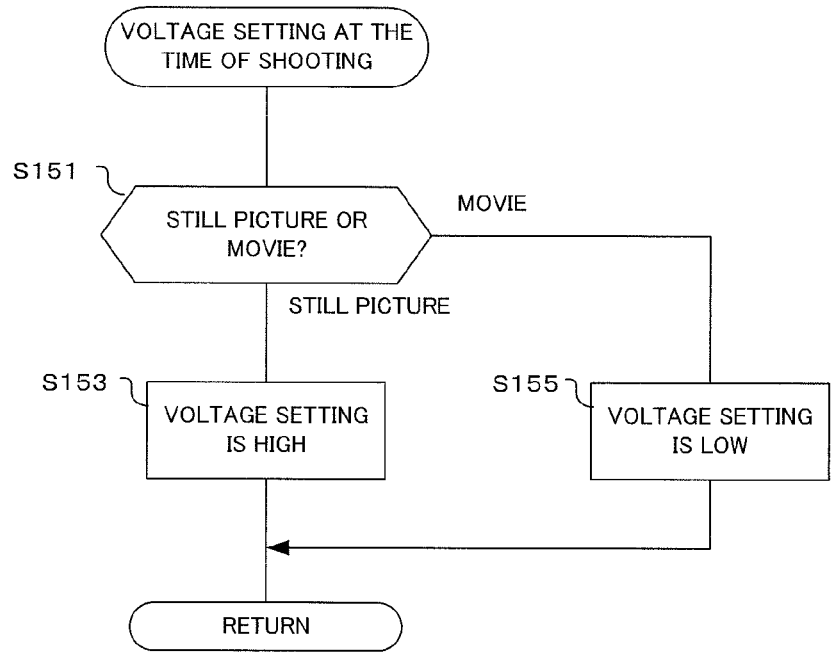
FIG. 16 is a flowchart showing a fourth modified example of a voltage setting operation at the time of shooting, of the camera of one embodiment of the present invention.

If the flow for voltage setting at the time of shooting shown in FIG. 16 is entered, the CPU 21g determines whether it is a still picture or movie (S151). Normally still picture mode is set, or movie mode is set using the mode dial 8, and in this state movie mode is switched to if the movie record button 5 is pressed. In this step determination is made based on the operational state of the mode dial 8 and the movie record button 5.

If the result of determination in step S151 was that still picture was set, the CPU 21g makes the voltage setting high (S153). In the case of a still picture, since noise is easy to notice in a subject image, a permissible noise level is made small, and the DC/DC converter 29a is therefore controlled to make input voltage of the LDO regulator high.

On the other hand if the result of determination in step S151 was that movie was set, the CPU 21g makes the voltage setting low (S155). Compared to a still picture, with a movie noise will be difficult to notice in the subject image. Since there is no practical problem even if the permissible noise level is made high, the DC/DC converter 29a is controlled to make input voltage of the LDO regulator low, and power consumption loss is reduced.

In this way, with the voltage setting at the time of shooting of this modified example also, the CPU 21g controls the input voltage of the LDO regulator based on an operating mode, such as still picture or movie shooting mode. With this modified example also, in the case of shooting modes that will increase imaging noise of the image sensor (CMOS image sensor 22), the DC/DC converter 29a is controlled to make input voltage of the LDO regulator high, so that imaging noise is difficult to notice. On the other hand, in the case where there are not shooting conditions that will increase imaging noise of the image sensor, the LDO regulator input voltage is made low and power consumption loss is minimized.

Next, a fifth modified example of the voltage setting at the time of shooting in step S47 (refer to FIG. 9) will be described using FIG. 17. With this modified example, an operating mode is set, a zoom range is noted, and input voltage of the LDO regulator is controlled in accordance with whether the zoom range is an optical zoom range or an electronic zoom range.

Figure 17:
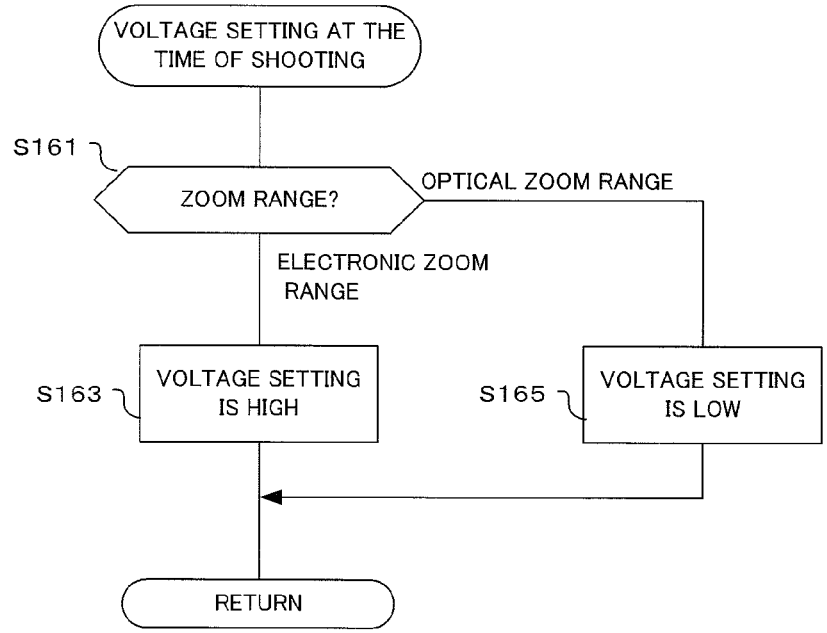
FIG. 17 is a flowchart showing a fifth modified example of a voltage setting operation at the time of shooting, of the camera of one embodiment of the present invention.

If the flow for voltage setting at the time of shooting shown in FIG. 17 is entered, the CPU 21g first determines whether a zoom range is an optical zoom range or an electronic zoom range (S161). If the Tele button within the zoom button 6 is pressed, and continues to be pressed after stopping at the tele end, electronic zoom is switched. In this step determination is in accordance with the zooming range that has been set using the zoom button 6

If the result of determination in step S161 was the electronic zoom range, voltage setting is made high (S163). In the case of the electronic zoom range, since trimming of image data is carried out noise will be easily noticeable in a subject image compared to the case of an optical zoom. Therefore, a permissible noise level is made small, and in order to do that the DC/DC converter 29a is controlled to make input voltage of the LDO regulator high.

On the other hand if the result of determination in step S161 was the optical zoom range, the CPU 21g makes the voltage setting low (S165). With the optical zoom range noise will be difficult to notice in a subject image compared to the electronic zoom range. Since there is no practical problem even if the permissible noise level is made high, the DC/DC converter 29a is controlled to make input voltage of the LDO regulator low, and power consumption loss is reduced.

In this way, with the voltage setting at the time of shooting of this modified example also, input voltage of the LDO regulator is controlled in accordance with whether the zoom range is an optical zoom range or an electronic zoom range. With this modified example also, in the case of operating modes that will increase imaging noise of the image sensor (CMOS image sensor 22), the DC/DC converter 29a is controlled to make input voltage of the LDO regulator high, so that imaging noise is less noticeable. On the other hand, in the case where there are not operating modes that will increase imaging noise of the image sensor, the LDO regulator input voltage is made low and power consumption loss is minimized.

As has been described above, with each of the modified examples of voltage setting at the time of shooting in the one embodiment of the present invention, input voltage of the LDO regulator is controlled based on operating modes such as ISO sensitivity, subject brightness, image compression rate, image size, art filter mode, shooting mode, still picture or movie, optical zoom range or electronics zoom range etc. It is therefore possible to optimize imaging noise of the image sensor and power consumption loss of the LDO regulator.

With each of the above modified examples that were described using FIG. 13 to FIG. 17, respective similar operating modes were determined. However, this is not limiting, and it is also possible to carry out voltage setting for the LDO regulator with combinations of various operating modes. Also, voltage setting of the LDO regulator has been described with two voltages, namely a high voltage and a low voltage, but this is not limiting, and various determination levels may be provided so as to enable voltage setting with three or more voltages, Also, each of the above modified examples that have been described using the flowcharts of FIG. 13 to FIG. 17 are applied to operation for the voltage setting at the time of shooting in step S47 (refer to FIG. 9), but they can also be applied to the LV voltage calculation and setting of step S11 (refer to FIG. 7). In this case, a less stringent level L2 is set as the permitted noise level, and the input voltage of the LDO regulator 29b is set in accordance with this. Compared to the requirements for noise level of a stored image, noise level for a live view image is not so stringent, and power consumption loss is made small.

As has been described above, with the one embodiment and each of the modified examples of the present invention, there are provided a variable voltage conversion section (for example, DC/DC converter 29a) that is supplied with power from a main power supply (for example, power supply battery 30), converts to a designated voltage based on control signals and outputs the converted voltage, a constant voltage section (for example, LDO regulator 29b) that receives output of the variable voltage conversion section and supplies a single constant voltage signal to the image sensor, a noise level prediction section (for example, S61 in FIG. 10, and S81 in FIG. 11) for predicting and outputting noise level for image data of the image sensor, and a control section (for example, S65, S69 and S71 in FIG. 10, and S85, S89 and S91 in FIG. 11) for calculating a voltage value input to the constant voltage section in accordance with the output from the noise level prediction section, and instructing an output voltage to the variable voltage conversion section. It is therefore possible to prevent degradation in image quality due to noise. Also, there are no constraints on shooting, such as transitioning to a specified mode in order to vary a constant voltage supplied to the image sensor in accordance with noise level, or lowering a CCD clock, etc., and so usability is not impaired.

Also, with the one embodiment and each of the modified examples of the present invention, at the time of shooting using the imaging section a voltage value input to the constant voltage section is calculated in accordance with output from the noise level prediction section and then designated (for example, S9 Yes>S11 in FIG. 7), while at times other than when shooting a predetermined specified voltage value is instructed (for example, S9 No>S19 in FIG. 7). Since control is carried out in accordance with whether to carry out or not carry out imaging using the imaging section, it is possible to reduce imaging noise and prevent power consumption loss.

Also, with the one embodiment and each of the modified examples of the present invention, at the time of imaging using the imaging section, a voltage value input to the constant voltage section is made different at the time of live view display and at the time of storage of image data (for example, permitted noise levels L1 and L2 in FIG. 6A and FIG. 6B). As a result, it is possible to achieve optimization of imaging noise and power consumption loss at the time of live view display and storage of image data.

Also, with the one embodiment and each of the modified examples of the present invention, a temperature measurement section (for example, temperature sensor 23) is provided close to the image sensor (for example, CMOS image sensor 22), for detecting temperature of the image sensor and outputting temperature data, and the noise level prediction section predicts noise level of the image sensor based on temperature data from the temperature measurement section, and outputs the predicted noise level (for example, refer to FIG. 10). Since predicted noise level of the image sensor is predicted on the basis of a result of temperature detection by the temperature detection section of the image sensor, accurate prediction is possible (refer to FIG. 5A).

Also, with the one embodiment and each of the modified examples of the present invention, an OB detection section (for example, OB region 22a in FIG. 4) is provided for detecting optically dark section data from pixels provided on an optically dark section of an imaging surface of the image sensor, and the noise level prediction section predicts noise level of the image sensor based on output of the OB detection section, and outputs the predicted noise level (for example, refer to FIG. 11). Since predicted noise level of the image sensor is predicted on the basis of the optically dark section data by the OB detection section of the image sensor, accurate prediction is possible (refer to FIG. 5C).

With the one embodiment and each of the modified examples of the present invention, LDO regulators 29*b*-29*f* have been used as the constant voltage section. However, the constant voltage section is not limited to LDO regulators, and may be any constant voltage circuit having a characteristic such that output noise decreases with increase in input voltage.

Also, with the one embodiment and each of the modified examples of the present invention, description has focused on the fact that a constant voltage is applied from the LDO regulator 22*b* to the CMOS image sensor 22, being an image sensor, but the present invention can be similarly applied to circuits and sensors in which noise is likely to be generated due to ambient temperature etc., such as the temperature sensor 23, WIFI communication section 51, the sensor group 24 etc. Also, with the one embodiment and each of the modified examples of the present invention, supplementary illumination of the subject at the time of shooting is supplied using flash light of the flash firing section 16*a*, but this is not limiting, and similar effects can be achieved using high intensity white LEDs or electric bulbs etc.

Further, with this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), game console etc. In any event, the present invention can be applied to a device that is susceptible to the occurrence of noise due to a power supply etc.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, operated by power supplied from a main power supply, comprising:
   an imaging section having an image sensor for forming a subject image and outputting image data;
   a variable voltage conversion section, supplied with power from the main power supply, for converting to a designated voltage based on control signals, and outputting the designated voltage;
   a constant voltage section that receives output of the variable voltage conversion section and supplies a constant voltage signal to the image sensor;
   a noise level prediction section for predicting and outputting a noise level of image data of the image sensor;
   a display switching section for carrying out display by switching between at least two types of display section, being a first display section provided on a rear surface of the imaging device and a second display section, having an eyepiece, for electronic view display; and
   a control section for calculating a voltage value input to the constant voltage section in accordance with a display section that has been switched to by the display switching section, and output from the noise level prediction section, and designating an output voltage to the variable voltage conversion section.

2. The imaging device of claim 1, wherein
   the control section calculates and designates a voltage value input to the constant voltage section in accordance with output from the noise level prediction section at the time of imaging using the imaging section, but designates a predetermined specified fixed voltage at times other than when imaging using the imaging section.

3. The imaging device of claim 1, wherein
   when imaging using the imaging section, the control section makes a voltage value input to the constant voltage section different at the time of live view display and at the time of storage of image data.

4. The imaging device of claim 1, further comprising:
   a temperature measurement section, provided close to the image sensor, for detecting temperature of the image sensor and outputting temperature data, wherein
   the noise level prediction section predicts noise level of the image sensor based on the temperature data from the temperature measurement section, and outputs the predicted noise level.

5. The imaging device of claim 1, further comprising:
   an OB detection section for detecting optically dark section data from pixels provided on an optically dark section of an imaging surface of the image sensor, wherein
   the noise level prediction section predicts noise level of the image sensor based on output of the OB detection section, and outputs the predicted noise level.

6. An imaging method for an imaging device that is operated by supply of power from a main power supply and has an imaging section including an image sensor for forming a subject image and outputting image data, and at least two types of display section, being a first display section provided on a rear surface and a second display section, having an eyepiece, for electronic view display, comprising:
   an output step of causing a variable voltage conversion section to convert a power supply from a main power supply to a designated voltage based on control signals, and output the designated voltage;
   a supply step of receiving output of the variable voltage conversion section and causing a constant voltage section to supply a constant voltage signal to the image sensor;
   a prediction step of predicting noise level of image data of the image sensor;
   a display switching step of carrying out display by switching between the first display section and the second display section; and
   a designation step for calculating a voltage value input to the constant voltage section in accordance with switching of the display section in the display switching step and the noise level prediction of the noise level prediction step, and designating an output voltage of the variable voltage conversion section.

7. A non-transitory computer-readable medium, storing a computer program for causing image processing to be executed by a computer of an imaging device that is operated by supply of power from a main power supply and has an imaging section including an image sensor for forming a subject image and outputting image data, and at least two types of display section, being a first display section provided on a rear surface and a second display section, having an eyepiece, for electronic view display, the image processing comprising:
- an output step of causing a variable voltage conversion section to convert a power supply from a main power supply to a designated voltage based on control signals, and output the designated voltage;
- a supply step of receiving output of the variable voltage conversion section and causing a constant voltage section to supply a constant voltage signal to the image sensor;
- a prediction step of predicting noise level of image data of the image sensor;
- a display switching step of carrying out display by switching between the first display section and the second display section; and
- a designation step for calculating a voltage value input to the constant voltage section in accordance with switching of the display section in the display switching step and the noise level prediction of the noise level prediction step, and designating an output voltage of the variable voltage conversion section.

8. The imaging device of claim 1, wherein:
the first display section and the second display section display a subject image based on the image data.

* * * * *